AUTOMATIC PHONOGRAPH

Filed March 10, 1961 15 Sheets-Sheet 1

INVENTOR.
David C. Rockola
BY Horton, Davis, Brewer & Brugman
Attys.

May 11, 1965 D. C. ROCKOLA 3,183,005

AUTOMATIC PHONOGRAPH

Filed March 10, 1961 15 Sheets-Sheet 2

INVENTOR.
David C. Rockola
BY Hofgren, Davis, Brewer & Brugman
Attys.

May 11, 1965 D. C. ROCKOLA 3,183,005

AUTOMATIC PHONOGRAPH

Filed March 10, 1961 15 Sheets-Sheet 3

INVENTOR.
David C. Rockola
BY Horton, Davis,
Brewer & Brinkman
Attys.

May 11, 1965 D. C. ROCKOLA 3,183,005

AUTOMATIC PHONOGRAPH

Filed March 10, 1961 15 Sheets-Sheet 4

INVENTOR.
David C. Rockola
BY Horton, Davis,
Brewer & Brugman
Att'ys.

INVENTOR.
David C. Rockola
BY Horton, Davis,
Brewer & Brugman
Attys.

INVENTOR.
David C. Rockola
BY Horton, Davis, Brewer & Brugman
Atty.

May 11, 1965 D. C. ROCKOLA 3,183,005

AUTOMATIC PHONOGRAPH

Filed March 10, 1961 15 Sheets-Sheet 7

INVENTOR.

David C. Rockola

BY Horton, Davis, Brewer & Brugman

Attys.

May 11, 1965 D. C. ROCKOLA 3,183,005

AUTOMATIC PHONOGRAPH

Filed March 10, 1961 15 Sheets-Sheet 8

INVENTOR.
David C. Rockola
BY Hofgren, Davis,
Brewer & Brugman
Attys.

AUTOMATIC PHONOGRAPH

Filed March 10, 1961 15 Sheets-Sheet 9

INVENTOR.
David C. Rockola
BY Hofton, Davis
Brewer & Brugman
Attys.

May 11, 1965 D. C. ROCKOLA 3,183,005

AUTOMATIC PHONOGRAPH

Filed March 10, 1961 15 Sheets-Sheet 10

INVENTOR.
David C. Rockola
BY Horton, Davis,
Brewer & Brugman
Attys.

INVENTOR.
David C. Rockola
BY Horton, Davis,
Brewer + Brugman
Attys.

May 11, 1965 D. C. ROCKOLA 3,183,005

AUTOMATIC PHONOGRAPH

Filed March 10, 1961 15 Sheets-Sheet 12

INVENTOR.

David C. Rockola

BY Horton, Davis, Brewer + Brugman

Att'y.

May 11, 1965 D. C. ROCKOLA 3,183,005

AUTOMATIC PHONOGRAPH

Filed March 10, 1961 15 Sheets-Sheet 13

INVENTOR.
David C. Rockola
BY Horton, Davis, Brewer + Brugman
Attys.

May 11, 1965 D. C. ROCKOLA 3,183,005

AUTOMATIC PHONOGRAPH

Filed March 10, 1961 15 Sheets-Sheet 14

INVENTOR.
David C. Rockola
BY Horton, Davis, Brewer & Brugman
Attys.

INVENTOR.
David C. Rockola
BY Horton, Davis,
Brewer & Brugman
Attys

United States Patent Office 3,183,005
Patented May 11, 1965

3,183,005
AUTOMATIC PHONOGRAPH

David C. Rockola, Chicago, Ill., assignor to Rock-Ola Manufacturing Corporation, Chicago, Ill., a corporation of Delaware Filed Mar. 10, 1961, Ser. No. 94,739
13 Claims. (Cl. 274—10)

The present invention relates to automatic phonographs.

A principal object of the invention is to provide in an automatic phonograph, novel means for making selections from the plurality of records contained in the magazine therein, for playing them on the usual turntable provided for that purpose.

A more specific object is to provide selection means of the character indicated which is extremely simple in construction and operation relative to the great number of records accommodated in the phonograph.

A still further object is to provide an automatic phonograph of the general character indicated which includes a mechanical portion providing extreme simplicity, and an electrical portion which facilitates accommodation of a large number of selections.

Another object is to provide in an automatic phonograph, selection means which includes a drum and a plurality of selection levers, one for each of the sides of the records accommodated in the phonograph, for use in making the selection of the records, which is of extremely simple construction.

A further object is to provide in an automatic phonograph a selector drum of the character just referred to having a novel arrangement of wiring for providing a large number of selection possibilities with a minimum of separate wires and other electrical instrumentalities.

Another object of the invention is to provide a novel selection pushbutton assembly for use in making manual selections of records.

A still further object is to provide a selection pushbutton assembly having novel interlocking means for preventing undesired additional selecting operations before previous selections are completed.

Other objects and advantages of the invention will appear from the following detailed description taken in conjunction with the accompanying drawings in which.

Figure 19:
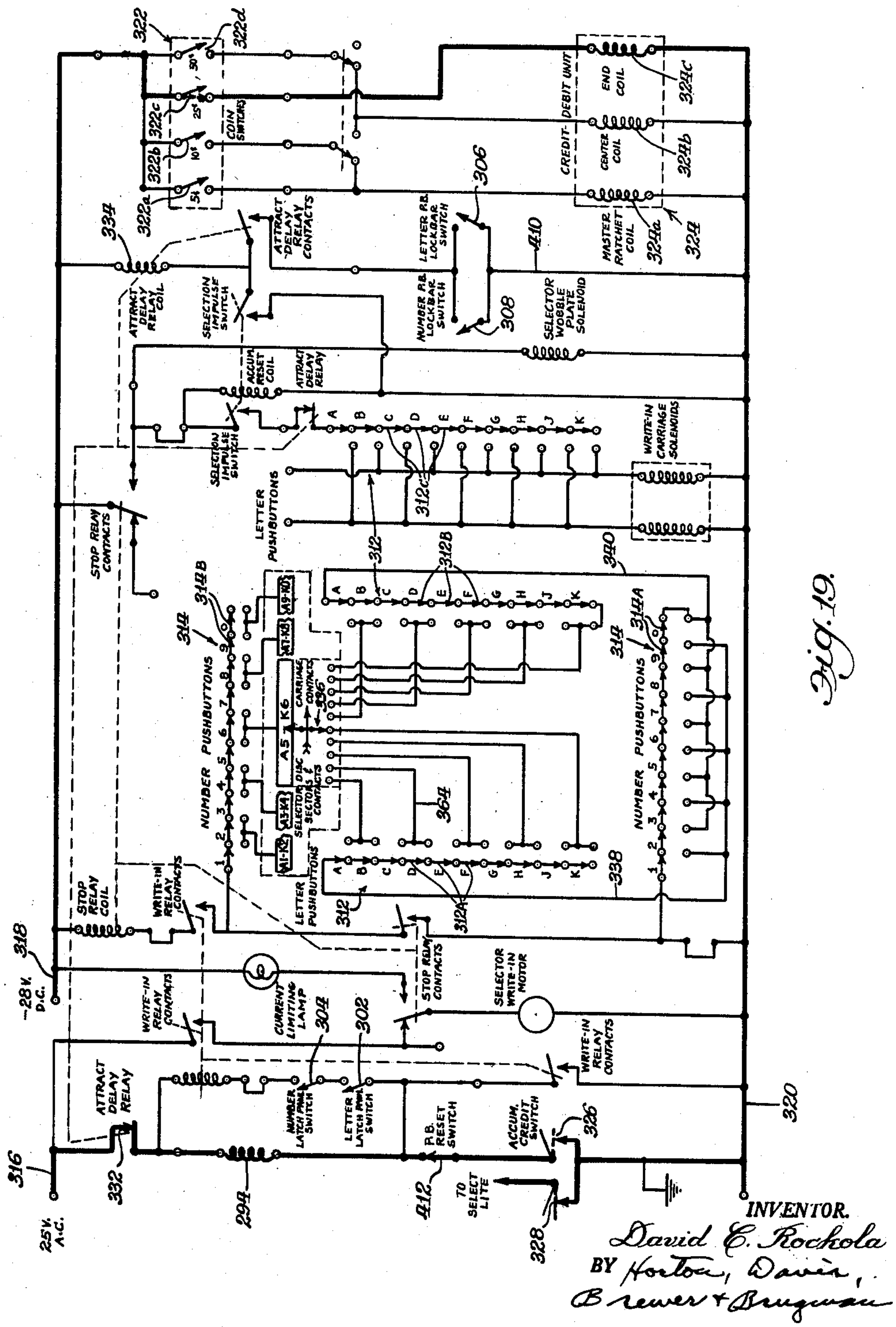
FIG. 19 is a diagram of a portion of the electrical circuit utilized in the automatic phonograph, as related to the novel selection mechanism of the phonograph, and including in heavy lines that portion thereof that is energized in an initial or early step in the sequence of operations of the phonograph.
Figure 20:
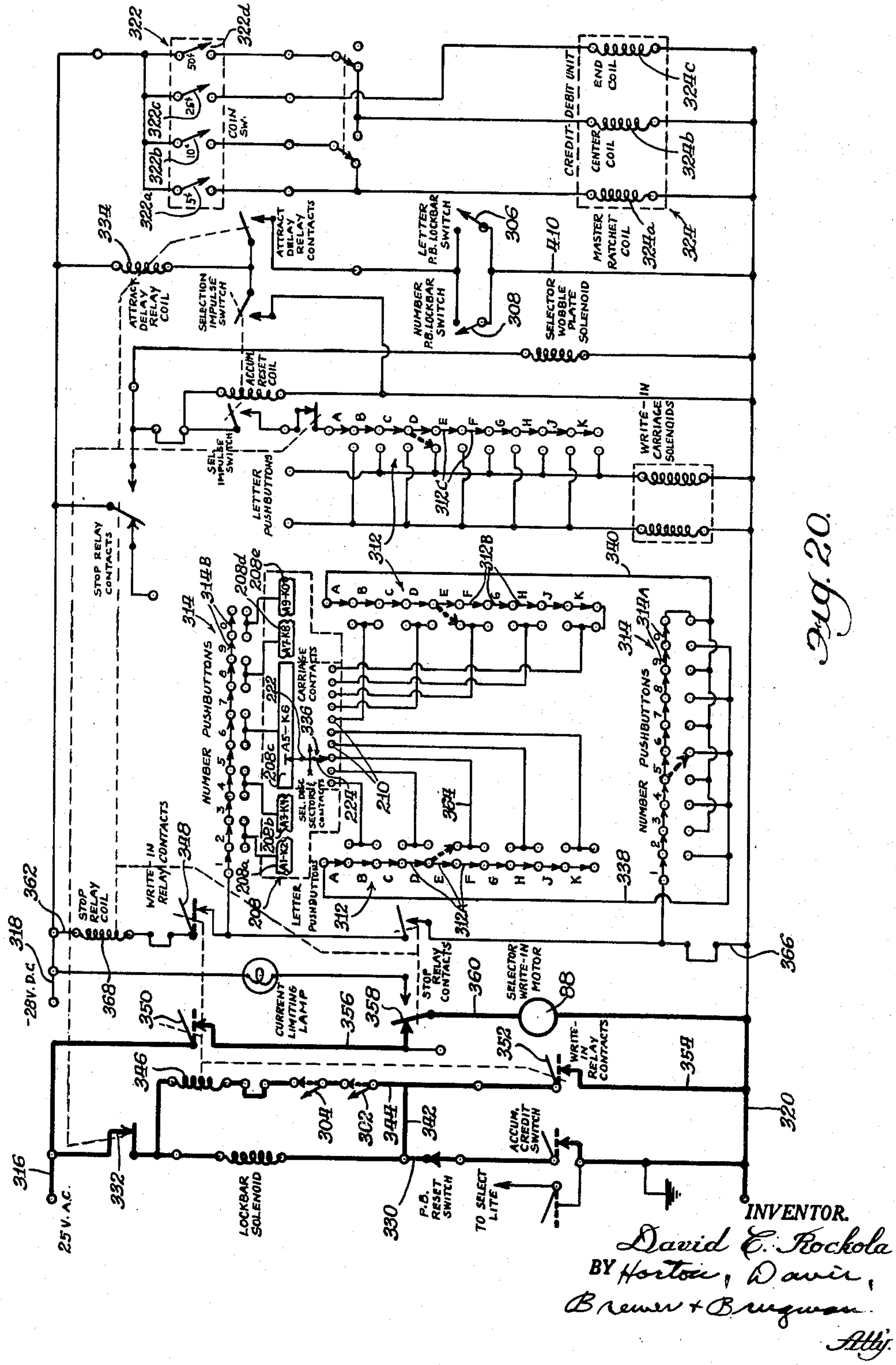
FIG. 20 shows the same diagram of FIG. 19 but with other and additional portions in heavy lines to show those elements thereof energized in a succeeding step in the sequence of operation.
Figure 21:
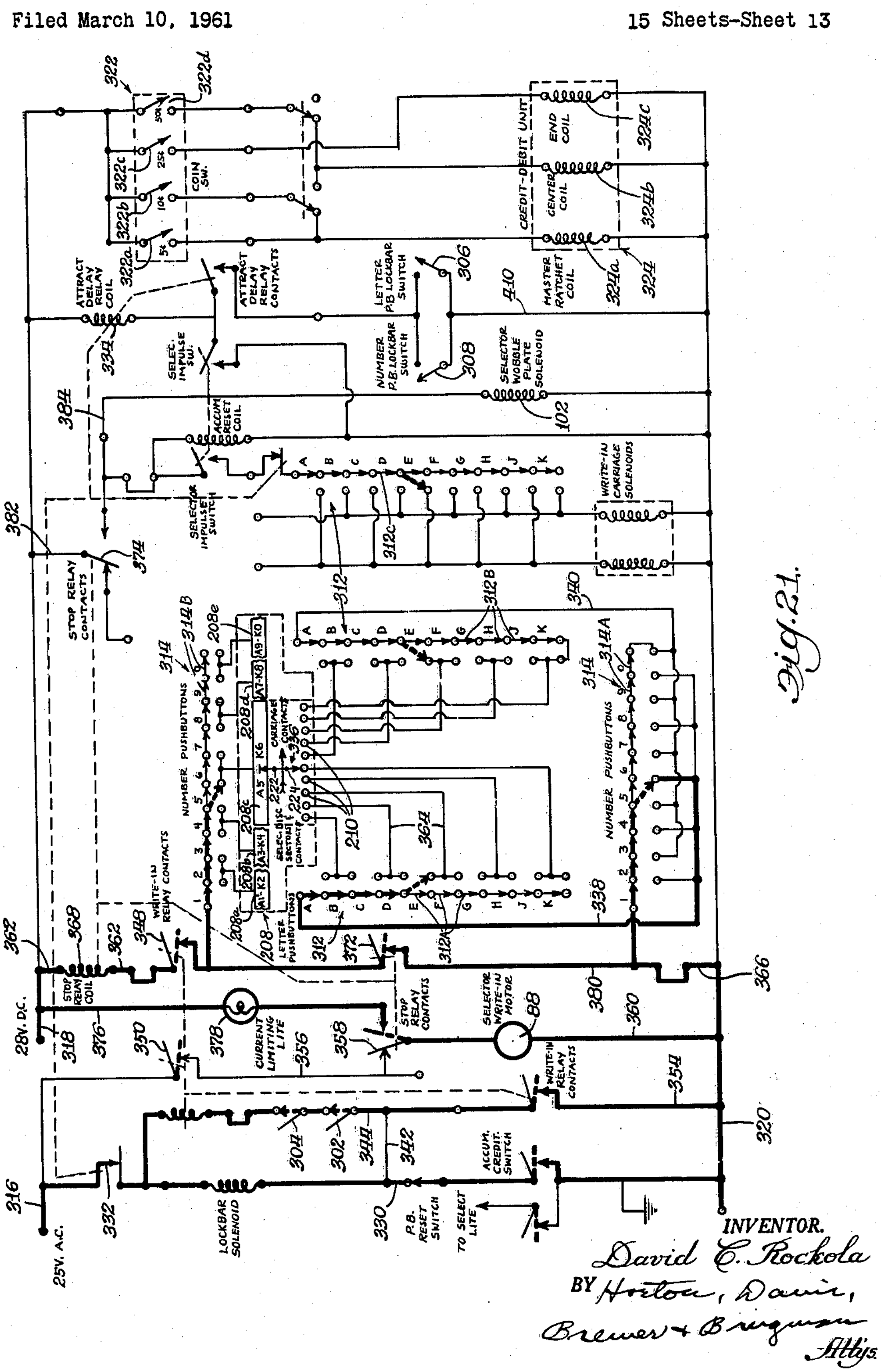
FIG. 21 shows the same diagram of FIGS. 19 and 20 but showing in heavy lines those elements energized in a further step in the sequence of operation.
Figure 22:
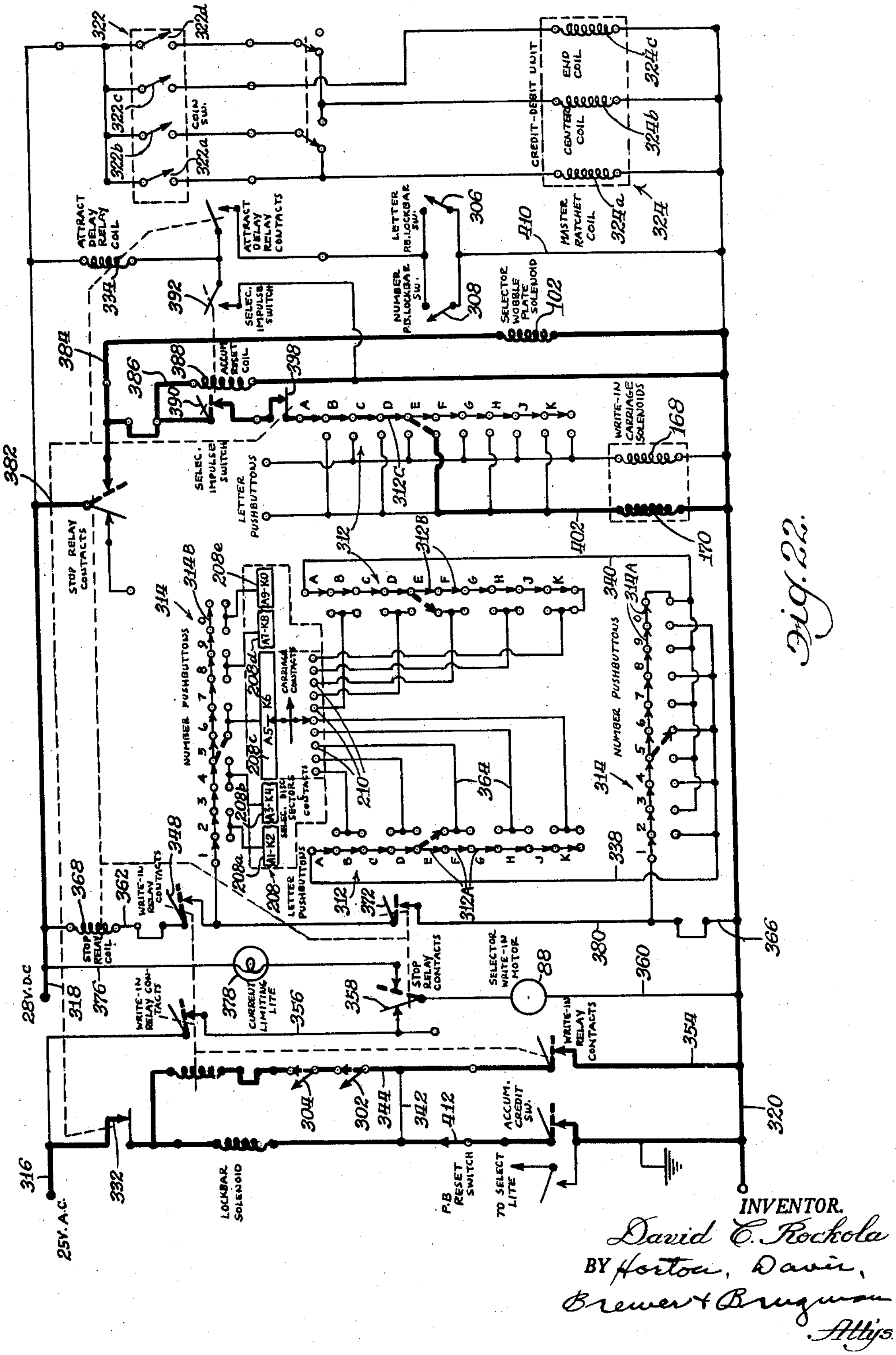
Figure 23:
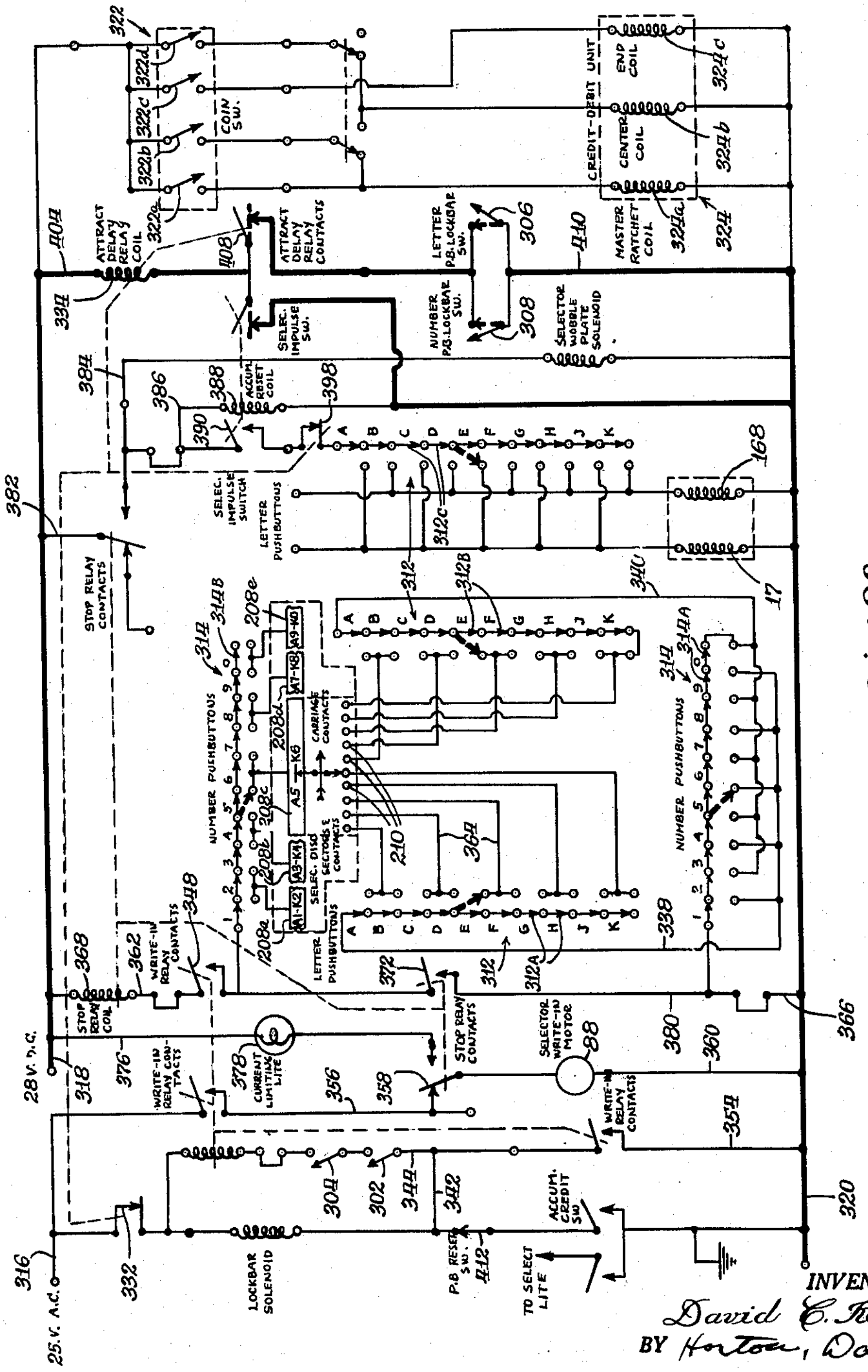

FIG. 22 also shows the same circuit of FIGS. 19, 20 and 21 and showing in heavy lines those portions of the circuit that are energized in a further step in the sequence of operations; and FIG. 23 additionally shows the same circuit of FIGS. 19–22 and showing in heavy lines the portions thereof energized in a final step in the sequence of operations pertinent to the novel features of the present invention.

Figure 1:
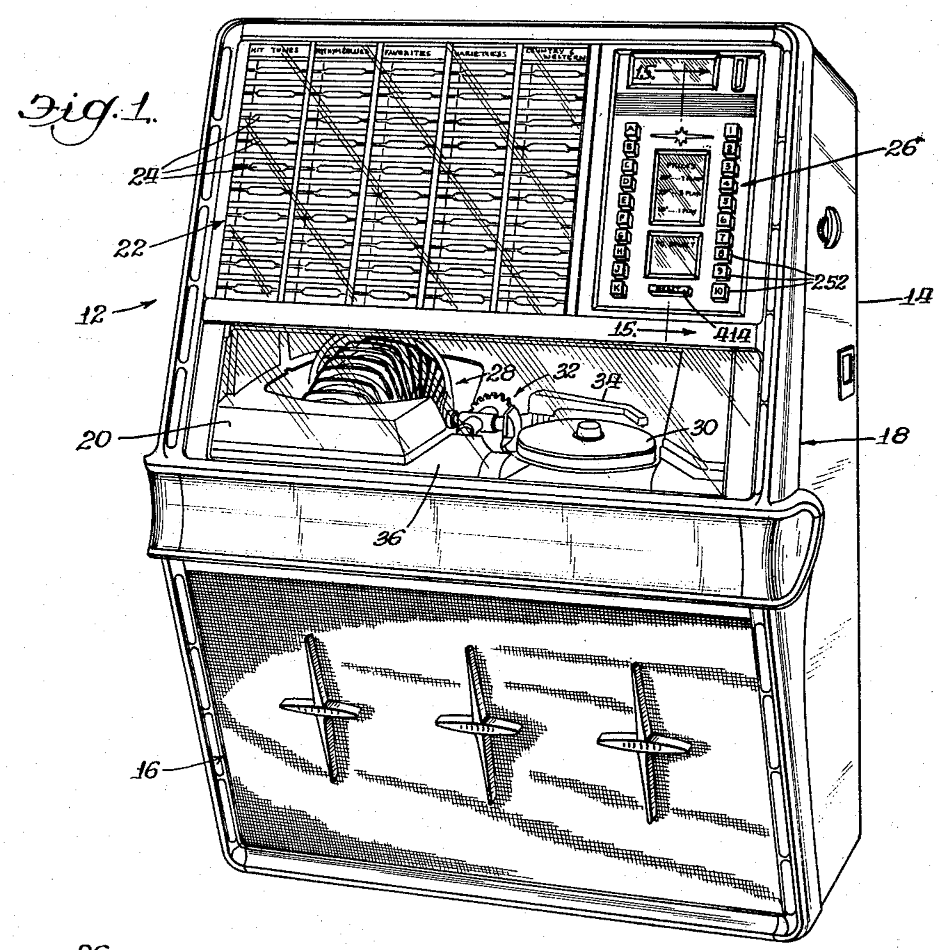
FIG. 1 is a perspective view of an automatic phonograph embodying the features of the present invention.
Figure 2:
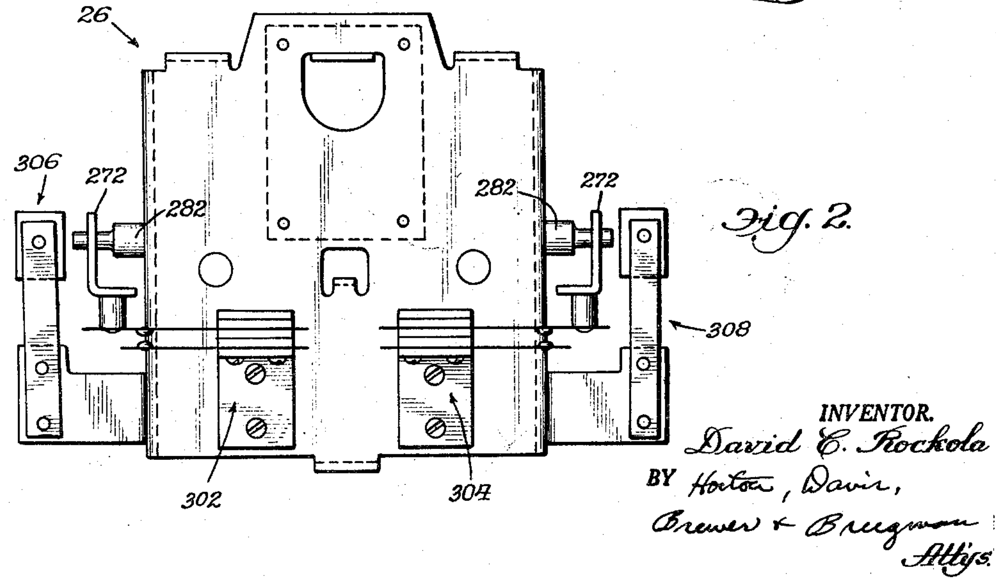
FIG. 2 is an end view of the pushbutton assembly, taken from the left end of FIG. 15.
Figure 3:
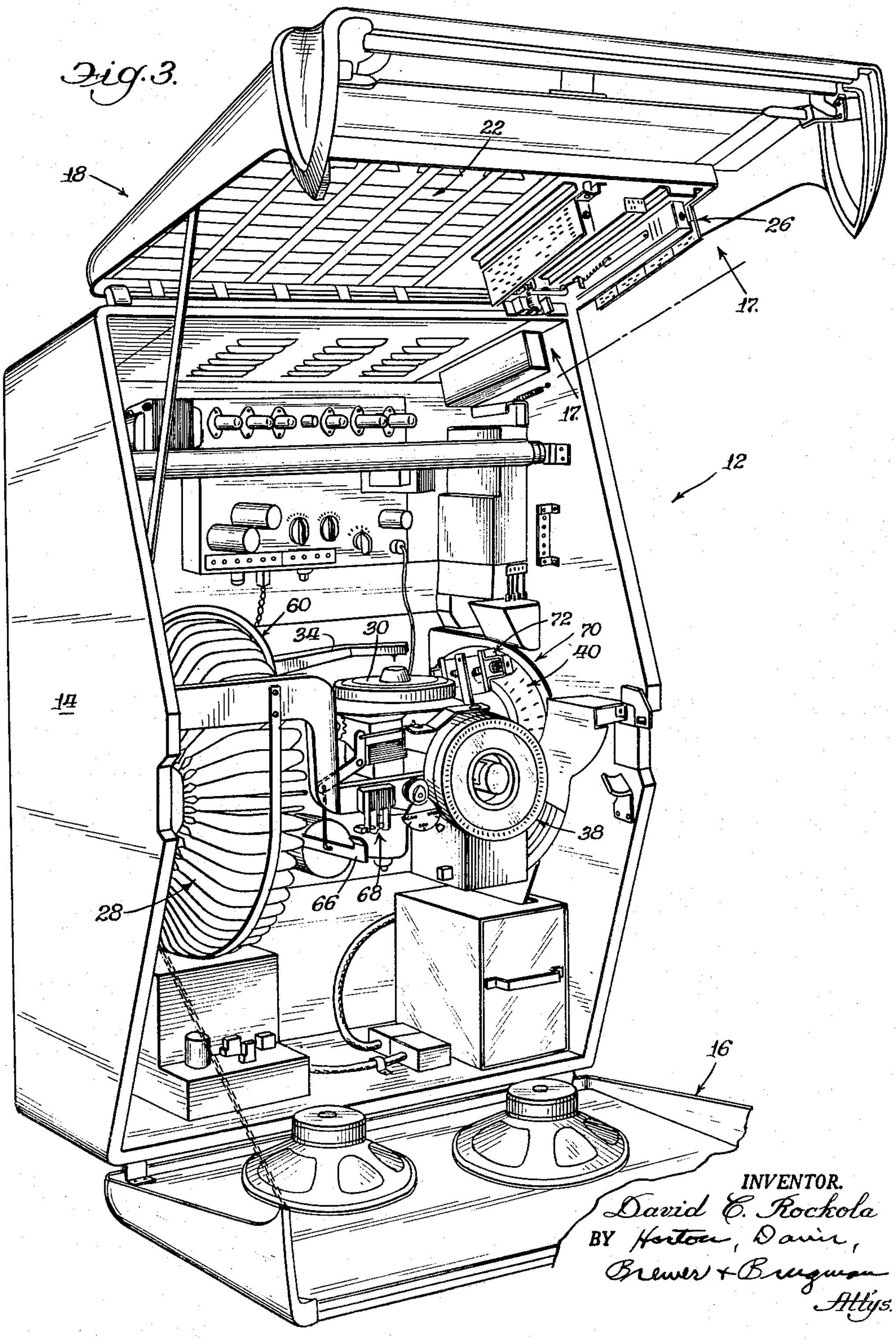
FIG. 3 is a perspective view of the phonograph with the front of the cabinet open, and an internal cover panel removed.
Figure 4:
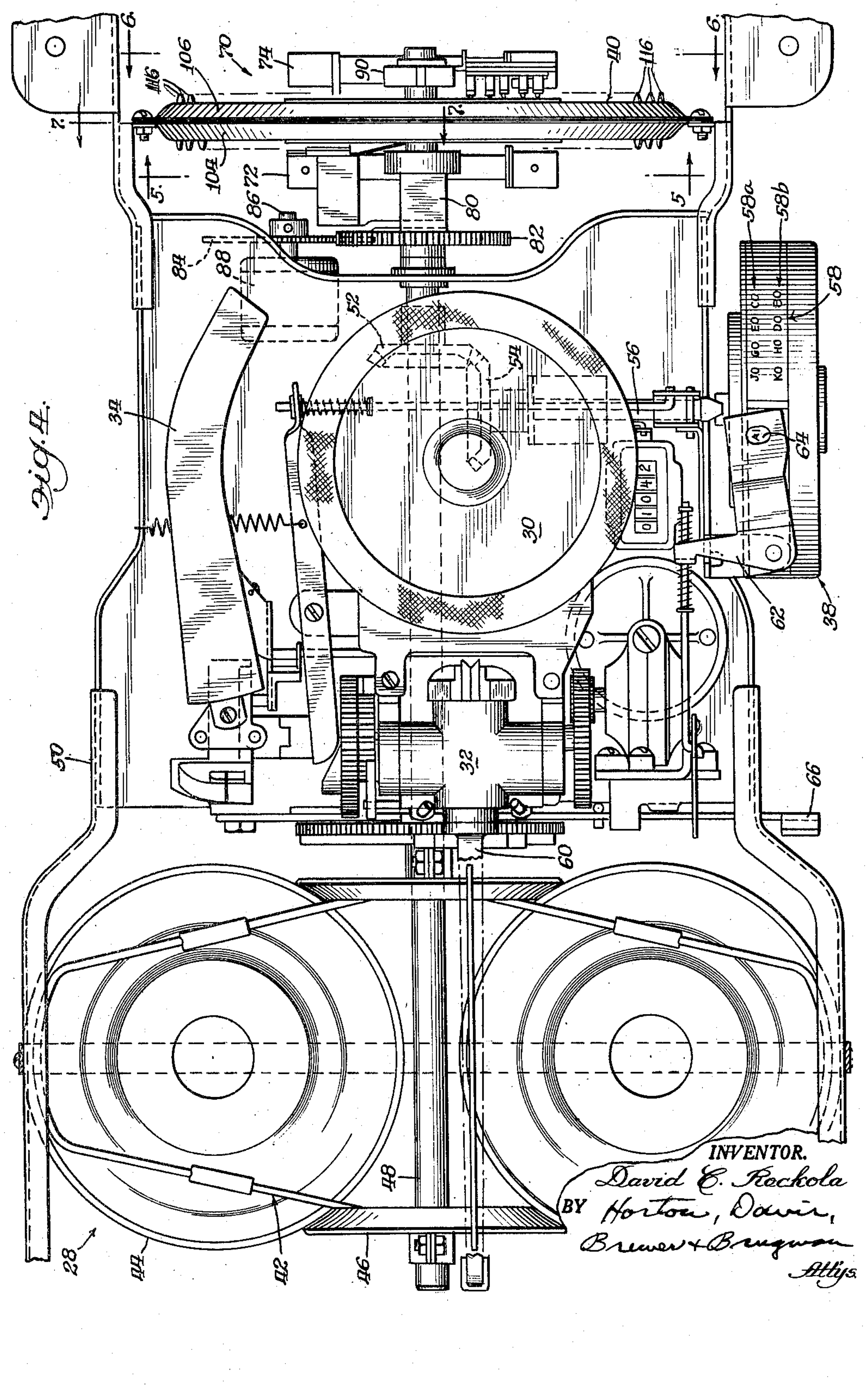
FIG. 4 is a plan view of the main mechanical operating parts, taken at a plane just above the center of FIG. 3.

Referring now in detail to the drawings, attention is directed first to FIGS. 1, 3 and 4 showing the general organization of the automatic phonograph embodying the features of the invention. Referring to FIGS. 1 and 3, the automatic phonograph indicated as a whole at 12 includes a cabinet 14 having a front side facing the observer in FIGS. 1 and 3. The cabinet includes two front closure members 16 and 18 covering the lower and upper portions respectively of the otherwise open front thereof, these cover portions being hinged at the bottom and top respectively and assuming a closed position shown in FIG. 1 in which they can be locked against the entrance to the interior by an unauthorized person but swingable to an open position shown in FIG. 3 exposing the interior of the cabinet and the mechanical operating parts and electrical components therein.

The upper closure member 18 is provided with a transparent panel 20 for observation by the patron of certain operating parts within the cabinet. It also includes a program area indicated in its entirety at 22 having a plurality of tabs 24, one for each of the records contained in the phonograph and each tab having titles thereon for both sides of the records. Also incorporated in the upper closure panel 18 is a pushbutton assembly indicated in its entirety at 26 which will be described in detail hereinbelow.

The principal operating parts of which only portions are exposed to the patron through the transparent panel 20 (FIGURE 1) include a record magazine 28, a turntable 30, a record transfer mechanism 32 and a tone arm 34. Provided in the interior of the cabinet is a transverse generally horizontal panel 36 concealing many of the operating parts and other components in the cabinet, but having openings for exposing portions thereof, mainly the magazine turntable, transfer mechanism and tone arm. This horizontal panel 36 is removed from FIG. 3 for exposing in that figure, more of the operating parts of the phonograph.

Attention is now directed more specifically to FIGS. 3 and 4 wherein the internal components referred to above are illustrated with additional components. Reference is made to my copending application, Serial No. 79,344, filed December 29, 1960, now Patent No. 3,129,005, issued April 14, 1964 disclosing and claiming certain features disclosed in the present application. Further details not described herein may be found fully described in that copending application. In addition to the components referred to above a popularity meter 38 is provided which also incorporates a record indicator therein. Also a selector drum 40 is provided.

The record magazine 28 includes a plurality of dividers 42 between adjacent ones of which records 44 are placed. The dividers 42 are mounted in hub means 46 which in turn is mounted on a horizontal shaft 48 mounted in suitable members of a framework 50 and extending transversely across the cabinet and through the selector drum 40. The frame 50 supports the mechanical operating parts shown in FIGS. 3 and 4, being suitably secured in position by brackets mounted on the walls of the cabinet. A gear 52 is mounted on the shaft 48, this gear meshing with another gear 54 mounted on a horizontal axis disposed in fore-and-aft direction, transverse to the axis of the shaft 48. The gear 54 is mounted on a shaft 56 which supports the popularity meter 38. The popularity meter includes on its outer surface, indicia 58 identifying the records 44 in the magazine. The gears 52 and 54 are of one-to-one ratio for effecting rotation of the popularity meter at the same rate as the magazine 28 which rotates for bringing the records selectively to an indexing position as described fully in my above mentioned copending application.

The record transfer mechanism 32 includes a gripper arm 60 for gripping the records 44 and transferring them between the magazine and the turntable. The operating mechanism includes a reversing mechanism described in the above entitled application, and this reversing mechanism in addition to controlling the placement of the records on the turntable also controls an indicator arm 62 for cooperation with the indicia 58 on the popularity meter 38. The indicia 38 includes two rows of inscriptions, 58*a* and 58*b*, corresponding to respective sides of the records, for example, the inscription 58*a* designating the obverse sides of the records while the inscription 58*b* may designate the reverse sides of the record. The arrangement is such that in one revolution of the magazine the obverse sides of the records are played, while in succeeding rotation the reverse sides are played. The reversing mechanism operates to swing the indicator arm 62 to each of opposite positions wherein the aperture 64 in that arm exposes the inscriptions in the corresponding row, namely the inscriptions 58*a* or 58*b*. When the selected record reaches the indexing position (adjacent the top) the indicium 58 corresponding to that record is at a viewing position, namely in register with the aperture 64, and the position of the arm 62 determines which indicium in the row 58*a* or the row 58*b* is in line with the aperture, and the position of the arm 62 in turn is determined by the reversing mechanism referred to which determines which side of the selected record is played.

While the reversing mechanism as such is disclosed and claimed in other patents, such, for example, as my Patent No. 2,804,307, dated August 27, 1957, reference to certain phases thereof are made herein for purposes of facilitating description of the novel features of the present invention. Among the features directly affecting the operation of the parts making up the present invention is an arm 66 (FIGS. 3 and 4) which is swung alternately vertically to upper and lower positions in synchronism with the reversing mechanism, and this arm controls a switch 68 as by closing it and by permitting it to open, or vice versa, in response to the vertical movements of the arm. The switch means 70 performs certain control functions either directly or related to certain phases of the selector drum 40 and associated instrumentalities.

Figure 5:
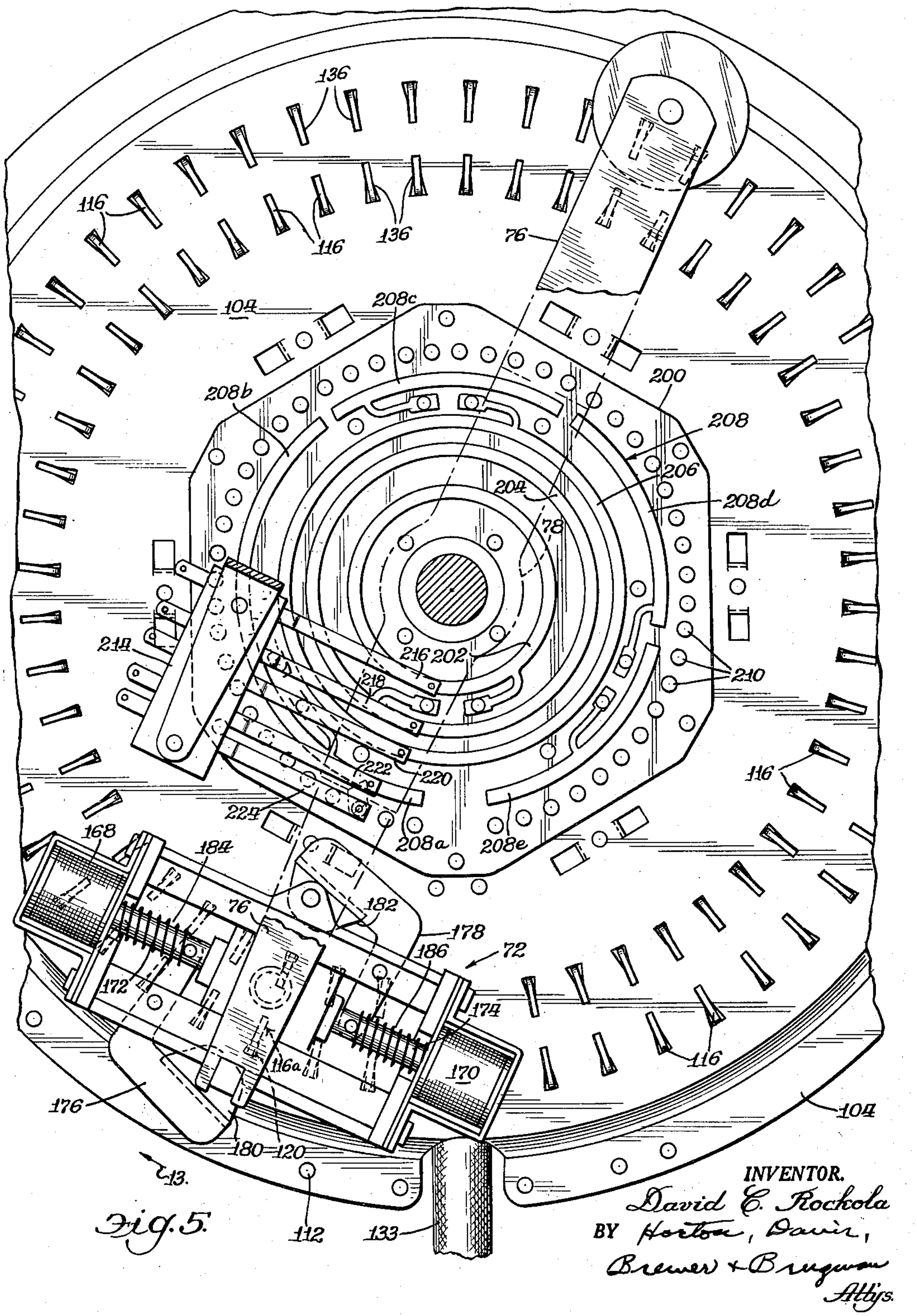
FIG. 5 is a large scale view taken on line 5—5 of FIG. 4.
Figure 6:
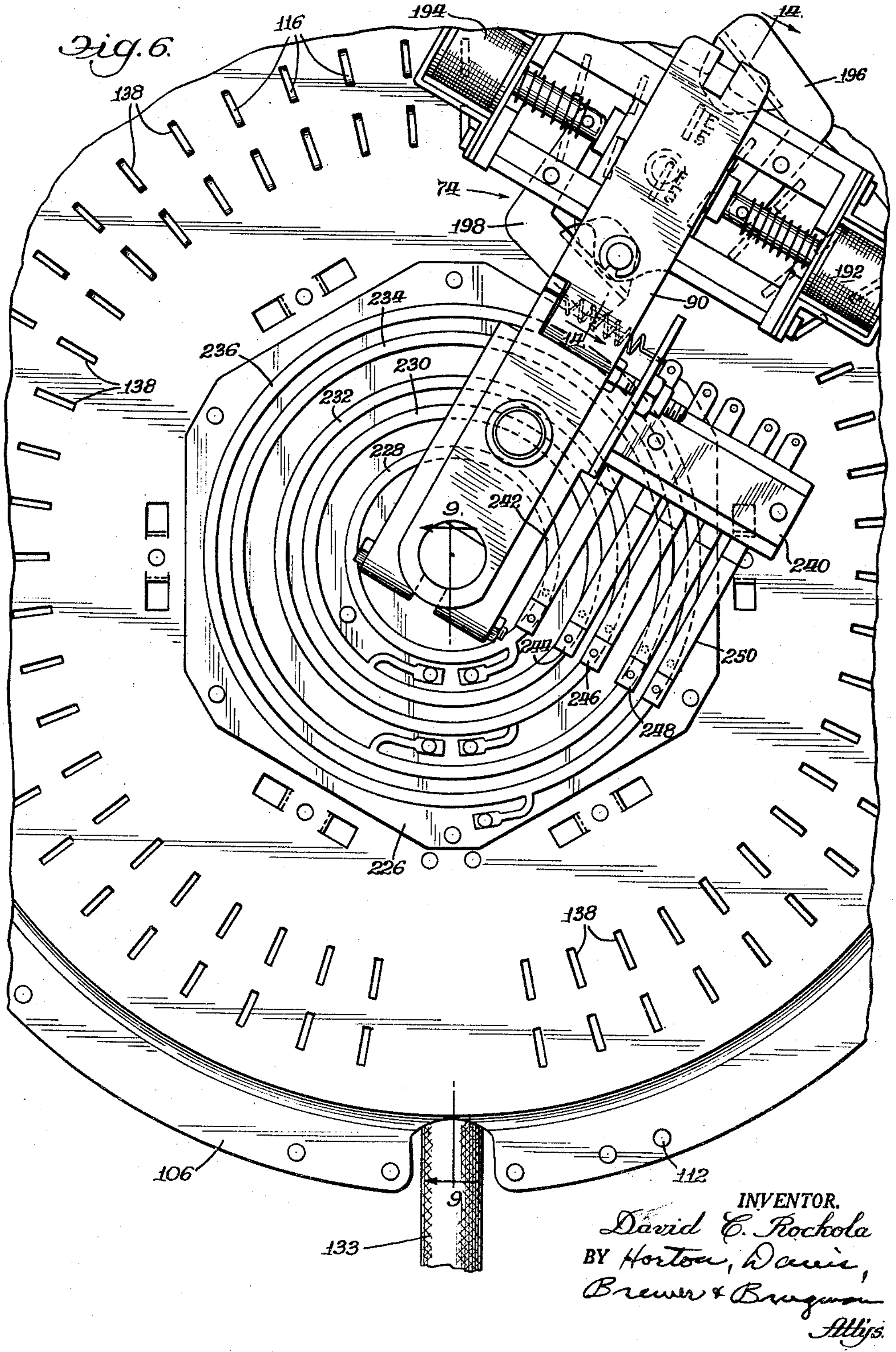
FIG. 6 is a large scale view taken on line 6—6 of FIG. 4.

The selector drum 40 is in the form of a unitized construction, the details of which are described below, and is incorporated in a selector assembly indicated in its entirety at 70, which includes a write-in carriage 72 and a read-out carriage 74, both arranged for sweeping over the drum 40 about the axis of the shaft 48, in the selecting and playing operations. The carriages are also shown in FIGS. 5 and 6, and referring first to FIG. 5 and the write-in carriage 72, this carriage is mounted on an arm 76 including a hub portion 78 having bearing support on the shaft 48 and arranged for rotation relative thereto. In FIG. 5 the central portion of the arm 76 is removed for exposing elements disposed thereunder. The hub portion 78 of the arm 76 is secured to a sleeve 80 (FIG. 4) rotatable relative to the shaft 48 and carrying a gear 82 for rotation therewith, this gear meshing with another gear 84 secured to a shaft 86 driven by a motor 88 (FIG. 4) here illustrated only diagrammatically, and mounted in any suitable location on the frame 50. The write-in carriage 72 is thus operated by means of the motor 88, and is so operated independently of the magazine 28, while the read-out carriage 74 is mounted on the shaft 48 for rotation directly with the magazine. The read-out carriage 74 is mounted on an arm 90 (FIGS. 4 and 6) fixedly secured to the shaft 48. The detail construction of these carriages 72 and 74 will be given hereinbelow.

Reference is next made to the detail construction of the selector drum 40 as illustrated particularly in FIGS. 5–12 inclusive. The drum 40 includes a central mounting plate 92 (FIG. 8) which provides the core or mounting means for the drum as a whole. This plate 92 is generally continuous, except for certain holes described hereinbelow, and includes a central bearing member or bushing 94 (FIG. 7) receiving the shaft 48. This central plate 92 has a projection or extension 96, extending beyond the periphery of the other portions of the drum which may for convenience be circular except for this extension. This projection 96 may be of right-angular outer contour and serves as a means for mounting a switch 100 and a solenoid 102, both of which will be referred to again hereinbelow.

Figure 8:
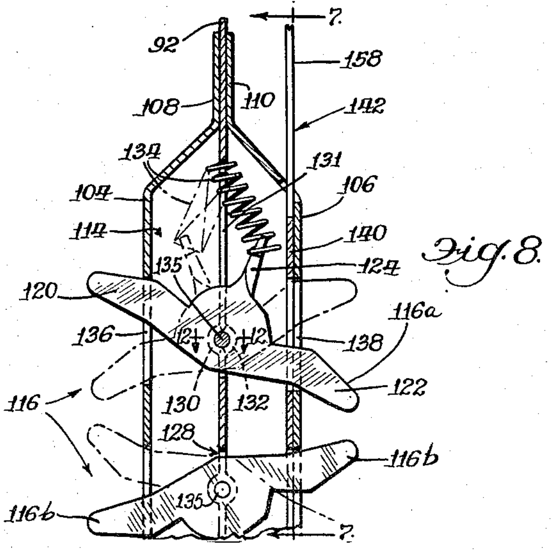
FIG. 8 is a sectional view taken at line 8—8 of FIG. 7.
Figure 9:
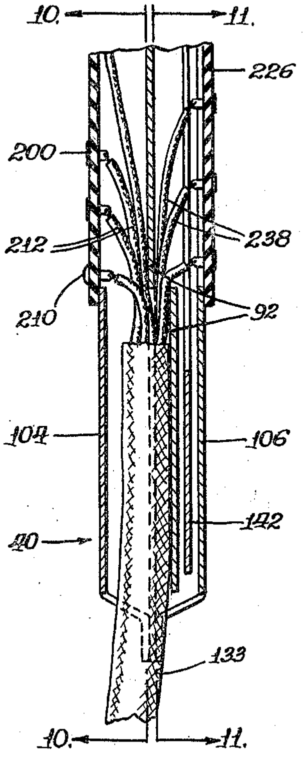
FIG. 9 is a sectional view of a portion of the selector drum taken at line 9—9 of FIG. 6.
Figure 10:
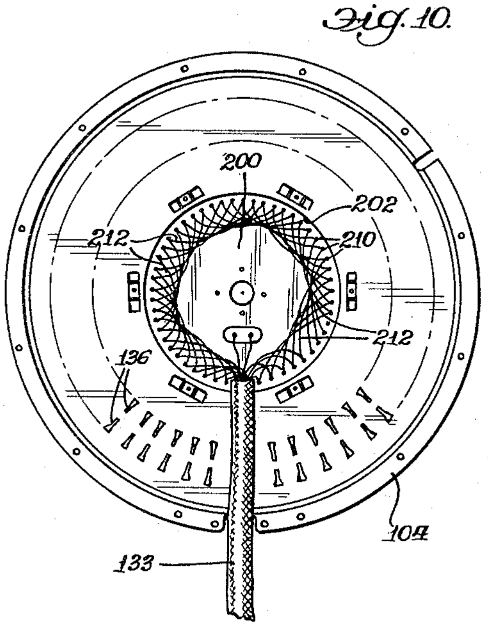
FIG. 10 is a view of the inner face of one of the cover plates of the selector drum, and taken approximately at line 10—10 of FIG. 9.

The selector drum 40 also includes cover plates 104 and 106, the first of which (104) may be referred to as the write-in cover plate, being disposed on the inboard side of the drum (FIG. 4) for cooperation with the write-in carriage 72. The other cover plate 106, or read-out cover plate, is disposed on the outboard side of the drum (FIG. 4) for cooperation with the read-out carriage 74. The cover plates 104 and 106 have flanges 108 and 110 respectively (FIG. 8) butted to and secured to the periphery of the central plate 92 and secured thereto by suitable means such as screws 112 (FIGS. 5 and 6). The inboard cover plate 104 is disposed facing the observer in FIG. 5, while the other cover plate 106 is disposed facing the observer in FIG. 6. The main central portions of the cover plates 104 and 106 are belled outwardly to provide an interior space 114 therebetween (FIGS. 8 and 9). The drum is fixedly mounted in the frame 50 by suitable means such as screws passing through the flanges of the cover plates and the mounting plate 92.

Mounted in the selector drum 40, and more particularly in the central plate 92 thereof, is a plurality of selector levers 116, there being two such levers for each record accommodated in the phonograph, or one for each side of each record. In the example assumed herein, the magazine is of fifty-record capacity, and thus one-hundred sides or plays are provided. The selector levers 116 are arranged in two circular series or rows (FIG. 7) concentric about the shaft 48, providing an outer circular row 116*a* and an inner circular row 116*b*, there being two levers in the two rows in radial alignment corresponding to the two sides of a record. Accordingly there are fifty such pairs of selector levers spaced angularly around the selector drum, those of each pair aligned radially.

Figure 7:
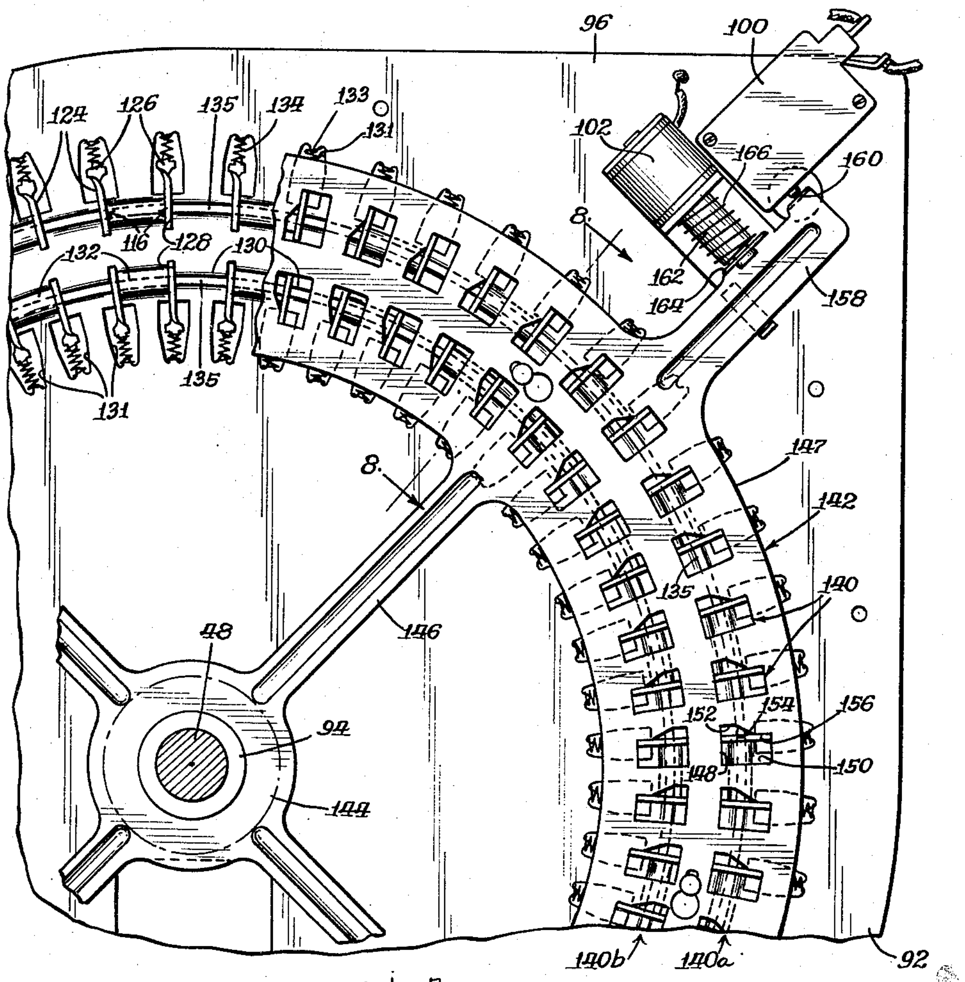
FIG. 7 is a fragmentary view of the interior of the selector drum and taken approximately at line 7—7 of FIG. 8.

The selector levers 116 are all identical, but those in the two rows 116*a* and 116*b* are arranged oppositely, and a description of one will serve for all. Each selector lever includes a main central portion 118 and lateral finger elements 120 and 122 respectively, and a central arm element 124 given a 90° twist and having lateral abutments 126 (FIG. 7).

Each selector lever 116 is mounted in a slot 128 formed in the central plate element 92, and the successive portions of the plate element between the successive slots are oppositely bowed as indicated at 130 and 132 respectively (FIGS. 7 and 8) for receiving and mounting an axis element 134 which supports the selector levers, and is in the form of a circular wire (FIG. 7) mounting all of those selector levers of each row. Each circular wire is slightly less than a full circle and is put in place by forcing a leading end of the wire through holes in the selector levers as the latter are placed in the slots between the bowed portions 130 and 132. The bowed portions 130 and 132 form an effective linear, but circular aperture, together confining the circular wire in place. The selector levers 116 also form slightly less than a full circle as is shown in FIG. 6 for accommodating other elements of the structure, including a cable 136 (FIGS. 5 and 6).

Each slot 128 merges into a wide hole 131 (FIGS. 7 and 8) formed in the plate 92 and at the end of the hole facing the arm element 124 is a small projection 133. A compression spring 134 is interposed between the marginal edge of the hole and the arm element 124, the projection 133 extending into the spring at one end and the end of the arm element 124 projecting into the other end of the spring. The selector lever 116 is pivotal on the axis element or wire 135 between opposite positions, shown respectively in full and dot-dash lines in FIG. 8, and in each position the compression spring 134 maintains the finger stably in that position, the spring functioning as an over-center control element. The selector levers 116 in their opposite positions just referred to and shown best in FIGS. 8, 13 and 14, serve to control selecting operations described more fully hereinbelow.

The arm elements 120 and 122 of the selector levers 116 (FIG. 8) extend through slots 136 and 138 respectively in the cover plates 104 and 106 to the exterior of the selector drum for engagement by actuating elements of the write-in carriage 72 and read-out carriage 74 respectively, as explained more fully hereinbelow. The projection of these finger elements or arm elements is shown most clearly in FIGS. 8 and 4.

The arm elements 122 of the selector fingers 116 extend also through apertures 140 in a wobble plate 142 (FIGS. 7 and 8) incorporated in and forming a part of the selector drum. This wobble plate includes a central hub element 144 mounted on and supported by the bearing element 94 for rocking or angular movement thereon. The structure of the wobble plate is spider-like in form, including radial arms 146 leading from the hub element to an annular portion 147 which nearly covers the holes 130 in the central plate 92. The annular portion 147 includes the apertures 140 mentioned, arranged in two series or rows 140*a* and 140*b* corresponding to the two rows 116*a* and 116*b* of the selector levers 116, there being one such aperture for each lever.

Each aperture 140 is of radial dimension or extent sufficient to accommodate the radial swinging movements of the levers 116, as will be evident from FIGS. 7 and 8; and each aperture at one side, considered circumferentially, is provided with inclined camming elements. Each aperture includes a relatively wide portion 148 and a relatively narrow portion 150 (FIG. 7), the aperture at one side including an element 152 at the wide side leading into an inclined element 154 which in turn leads into an element 156 at the narrow side. The apertures 140 in the two rows 140*a* and 140*b* thereof are oppositely disposed, i.e., with their wide sides presented toward each other, for a purpose to be explained hereinbelow. Suffice it to say at the present time that the selector levers 116 in their swinging movements are adapted to engage the elements 156 of the apertures for retaining the wobble plate 142 in an advanced position.

The wobble plate 142 includes a radial extension 158 positioned for engaging a pin 160 of the switch 100 and in response to rocking or angular movements of the wobble plate to actuate this switch, such as by closing it in response to depression of the pin 160. The wobble plate 142 is assisted in its movements by means of the solenoid 102 referred to above, the solenoid having an armature 162 connected with the extension 158 through the intermediary of a flange 164. A compression spring 166 is interposed between the coil of the solenoid 102 and the flange 164 and serves to bias the armature outwardly and the wobble plate 142 in clockwise direction. Upon energization of the solenoid 102 the armature 162 thereof is withdrawn and moves the extension 158 toward it and the wobble plate in counterclockwise direction. This movement of the wobble plate by the action of the solenoid 102 assists the action of the selector levers 116 in so moving the wobble plate, or preferably moves the wobble plate and enables the selector levers to retain it in such advanced position when the levers are moved to the corresponding position. This position of the levers is indicated in dot-dash lines in the lever 116*a* of FIG. 8. The arm element 122 thereof in moving radially outwardly from the center of the selector drum moves out of registration with the element 152 (FIG. 7) of the aperture 150 into registration with the element 156 thereof. In the absence of the action of the solenoid 102 in so moving the wobble plate, the selection lever 116 could engage the inclined element 154 of the aperture and cam the wobble plate in the corresponding direction; and when the lever reaches its position as shown in FIG. 8, the right-hand end thereof is in such registration with the element 156 of the aperture and retains the plate in such advanced position. However, the wobble plate is of relatively massive proportions and the resistance to such movement offered by various elements is substantial, and hence upon the selection lever 116 being moved to the full line position of FIG. 8 the solenoid 102 is energized simultaneously therewith so that the movement of the wobble plate by the lever is eliminated and the selector lever is utilized in merely holding or retaining the wobble plate in advanced position. The same action is accomplished in connection with the inner row of selector levers 116*b*, and since the levers are actuated in opposite directions, as will be explained more fully hereinbelow, the camming elements 152, 154 and 156 in the respective rows of apertures 150 are arranged in opposite direction.

The slots 136 and 138 in the cover plates 104 and 106 of the selector drum are of different shapes, as shown best in FIGS. 5 and 6, for facilitating assembly of the part of the selector drum. The slots 136 are relatively wide at one end while the slots 138 are uniformly narrow. In assembling the selector levers 116, the cover plate 106 may be secured to the central plate 92 before assembling those levers, and in putting the levers in place they are placed in the slots 128 in the central plate 92 and their arm elements 120 extended through the narrow slots 138, which may be done with facility since the levers are handled individually. After all of the levers 116 in both rows, 116*a* and 116*b* are mounted on the wires 135 they are moved to such positions that the arm elements 122 thereof are spread apart relative to each other, that is, they assume the positions shown in full lines in FIG. 8. After all of the selector levers are so positioned, the other cover plate 104 is put in position, this step being facilitated by the wide portions of the slots 136 therein. The arm elements 122 of the levers are disposed for projecting through the wide portions of those slots and thus any slight misalignment of the selector levers is accommodated by those wide portions and not prevented from entering into the slots. When the selector levers are in set position, or as indicated in dot-dash lines in FIG. 8, the ends 122 thereof are in the narrow portions of the sloth 136 and are held thereby in firm position against any tendency of the read-out carriage to deflect them circumferentially.

Further detailed description of the selector drum 40 will be given hereinbelow but meanwhile reference is made to the write-in and read-out carriages 72 and 74 respectively. These carriages have means for moving the selector levers 116 to positions respectively opposite those in which they happen to be, for use in the selecting functions. The construction of the carriages, and their operation in moving the selector levers, are substantially identical. The write-in carriage 72 serves to move the selector levers to advanced or selecting position, while the read-out carriage 74 serves to cancel the selections or move the selector levers to their normal or retracted position.

Figure 13:
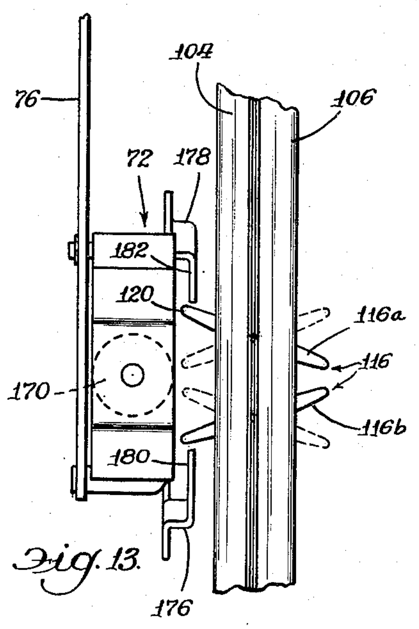
FIG. 13 is a sectional view showing the relation of the write-in carriage and selector drum, and taken approximately at line 13—13 of FIG. 5.

Reference is made to FIGS. 5 and 13 for the detailed construction of the write-in carriage 72. This carriage, as noted above, is mounted on the arm 76 and includes a pair of oppositely arranged solenoids 168 and 170 having armatures 172 and 174 pivotally connected with ball crank levers 176 and 178 pivotally mounted in fixed elements of the carriage and having their swinging ends provided with actuating elements 180 and 182 respectively arranged for actuating the selector levers in the two rows. The armatures 172 and 174 are provided with compression springs 184 and 186 biasing the armatures and the bell crank levers to their normal retracted position, opposed to the attractive action of the solenoids. Upon a selecting operation being performed, the write-in carriage 72 is moved to a position in register with that selector lever 116 which corresponds to the record selected, as explained more fully hereinbelow. Assuming the recording designated or identified by the indicium "E–5" the write-in carriage moves to the position shown in FIG. 5. In the selecting operation the solenoid 168 is energized which draws the armature thereof inwardly and swings the bell crank lever 176 in counterclockwise direction. The actuating element 180 thereof engages the arm element 120 of the selector lever **116*a* identified by the indicium "E–5." This operation moves the selector lever 116*a* corresponding to that selection to its opposite position which is in counterclockwise direction as viewed in FIGS. 8 and 13, moving the lever from its full line position to its dotted line position. The opposite arm element 122 thereof (FIG. 8) is thus moved radially outwardly for engagement by an element 188 by the read-out carriage 74 (FIG. 14) referred to again hereinbelow. The energization of the solenoid 168 is only momentary and upon the operation being performed thereby, the compression spring 184 moves the armature 172 outwardly and swings the bell crank lever 176** to retracted position shown in FIG. 5.

On the other hand, if the same record, but the opposite side thereof, is selected for playing, the opposite side being identified by the indicium "F-5" opposite solenoid 170 is energized with an operation and result similar to but opposite that just described in which the selector lever **116*b* in the inner row is moved, this being done by the bell crank lever 178 moving in counterclockwise direction. This operation results in the selector lever 116*b*** (FIGS. 8 and 13) being moved in clockwise direction from the full line position to the dot-dash line position. The electrical controls for effecting these operations just described, certain ones of which are included in the mechanical structure illustrated in FIGS. 5 and 10, will be referred to again hereinbelow.

After the selecting operation just described is performed, a reading-out operation is performed by the read-out carriage 74. Upon a selection being made by manual depression of the pushbuttons in the assembly 26, the write-in carriage 72 moves to the position of the record selected, and after its function is performed the magazine rotates to move the selected record to indexing position, and upon the magazine so rotating the read-out carriage 74 moves therewith. The read-out carriage 74, shown best in FIGS. 6 and 14, includes electrical contact elements 188 and 190 positioned for engaging the ends of the arm elements 122 (FIGS. 8 and 14) of the selector levers when the latter are in their advanced or set positions. The body of the selector drum, the selector levers, and the contact elements 188 and 190 are included in the electrical circuit of the phonograph. Upon contact engagement of these respective elements circuit portions are completed for effecting playing of the records selected in the manner described and claimed heretofore, such for example as in my prior Patent No. 2,804,307, mentioned above. The read-out carriage 74 (FIG. 6) includes solenoids 192 and 194, respectively, connected with bell crank levers 196 and 198, oppositely arranged and operating in a manner described in connection with the write-in carriage 72, for moving the selector levers 116 to the opposite position, and cancelling the selections. The operation of the read-out carriage results in the outer levers **116*a* being moved in clockwise direction or from the full line to the dot-dash line positions of FIG. 14 and the levers in the inner row 116*b* being moved counterclockwise from the dot-dash line to the full line position. The cancelling operation takes place after the read-out carriage 74 reaches the position corresponding to the selection made, and after the impulse determined by the particular selection is transmitted for the playing operation, the respective solenoid 192 or 194** is actuated to perform the cancelling operation of the corresponding selector lever.

The selector drum assembly includes other electrical elements arranged for respective cooperation in response to sweeping motions of the write-in and read-out carriages 72 and 74. Referring first to the write-in aspect of the selector assembly, attention is directed to FIGS. 5, 9 and 10. The cover plate 104 on the write-in side of the selector drum is provided with a panel 200 of insulating material secured to the cover plate and covering a relatively large hole 202 in the center of the plate. Secured to this panel 200 are a plurality of electrical contact elements including circular strips 202, 204, 206 and 208, the first three of these being continuous circumferentially and the outer one being composed of five separate and spaced apart segments designated with the subscriptions *a* to *e* inclusive, progressing in clockwise direction (FIG. 5) the write-in carriage 72 rotating in that direction in the operation of the phonograph. Outwardly of the contact strip segments 208, are a plurality of additional contact elements 210 which are in the form of rivets, 50 in number, and thus corresponding in number with the records the phonograph can accommodate. These rivets 210 are arranged with ten in association with each of the strip segments 208 in an electrical arrangement described in detail hereinbelow. The contact elements 202, 204, 206, 208 and 210 extend through the panel 200 where their inner extremities are interconnected variously by means of conductors 212, and with conductor elements of the cable 136 referred to above. The exact relation of these electrical connections will be described below in connection with the circuit diagrams of FIGS. 10 to 23, inclusive.

The arm 76 is provided with a lateral extension 214 (FIG. 5) upon which are mounted five contact arms 216, 218, 220, 222 and 224 positioned for engaging the contact elements 202, 204, 206, 208, 210, respectively. These contact arms are connected together or to other electrical elements in the circuit as described in detail hereinbelow.

Figure 11:
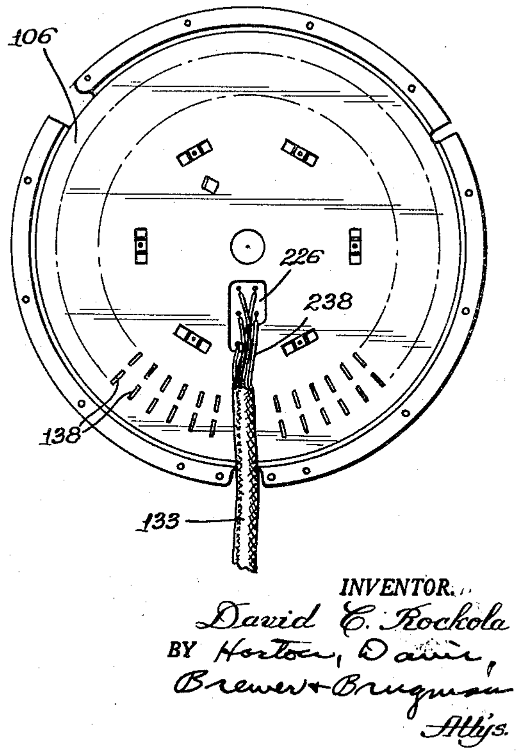
FIG. 11 is a view of the inner face of the other cover plate of the selector drum and taken approximately at line 11—11 of FIG. 9.
Figure 12:
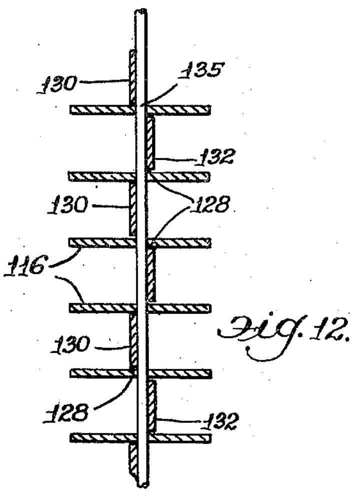
FIG. 12 is a sectional view taken at line 12—12 of FIG. 8.

Referring now to the opposite side of the selector drum assembly, attention is directed to FIGS. 6, 9 and 11. The cover plate 106 is provided on its outer surface with a panel 226 of insulating material, this panel being provided with a plurality of circular contact elements 228, 230, 232, 234 and 236, respectively, which are continuous circumferentially. These contact elements have terminal portions extending through the panel 226 where on the inner side of the cover plate (FIGS. 9 and 11) they are connected with conductors 238 of the cable 136. The arm 90 bearing the read-out carriage 74 is provided with a lateral extension 240 having a plurality of contact arms 242, 244, 246, 248 and 250 in engagement with the respective ones of the contact strip 228, 230, 232, 234 and 236 respectively. These contact arms are connected together or connected to other elements in the electrical circuit as referred to again hereinbelow. The read-out carriage 74 sweeps over the selector drum in counterclockwise direction (FIG. 6), the two carriages 72 and 74 sweeping in the same direction when viewed from a common position, and in the same direction as the rotation of the magazine 28.

Attention is next directed to the pushbutton assembly 26 (FIG. 1) and the detailed construction thereof shown in FIGS. 15 to 18, inclusive. Included in the pushbutton assembly are a plurality of pushbuttons 252 arranged in two rows **252*a* and 252*b* respectively. Those in the first row bearing letters of the alphabet and those in the second row numerals. There are 10 pushbuttons in each row affording 100 combinations for selections of the 100 sides on the 50 records, the capacity assumed in the present disclosure. Each pushbutton 252 includes an outer finger-engaging block or body portion 254 and an inner stem or plunger 256 arranged for sliding movement in inward direction, in response to manual depression by the finger, and biased to an outward position by a compression spring 58 compressed between a collar on the stem and a fixed element 260** of the frame of the pushbutton assembly.

Associated with the rows **252*a* and 252*b* of pushbuttons, are lockbars 262*a* and 262*b* mounted for longitudinal sliding movement in directions transverse to the depressing movement of the pushbuttons, in response to depression of those pushbuttons. These lockbars 262 are identical except opposite in arrangement and each includes ten inclined slots 264 associated with the pushbuttons of the corresponding row. Each stem 256 of the pushbuttons includes a slot 266 receiving the bar 262 and having a transverse element 268 above the corresponding slot 264 and adapted for entry into the corresponding slot upon depression of the pushbutton. Upon such depression of any pushbutton, and entry of the element 268 into the corresponding slot 264, the lockbar 262 is cammed in the appropriate direction which is to the left as viewed in FIGS. 15, 16 and 17. The lockbars 262 may be mounted in any suitable fixed elements of the frame of the pushbutton assembly and are biased to a retracted position (to the right—FIGS. 15, 16 and 17) by compression springs 270** interposed between shoulders on the lockbars and fixed elements in the frame.

Each lockbar is provided with a laterally spaced supplementary bar element **262*b* rigidly secured thereto and positioned laterally beyond the stems 256 of the pushbuttons for facilitating mounting of a latch pawl 272. The latch pawl is pivoted on a pin 274 fixed on the bar element 262*b*, and includes an extension 276 connected to which is one end of a tension spring 278, the other end of the spring being connected to the bar element 262*b*, for biasing the latch pawl in corresponding direction, or counterclockwise and downwardly as viewed in FIGS. 15 and 16. Each latch pawl adjacent its swinging end is provided with an aperture 280 receiving a pin 282 mounted in a fixed element of the frame of the pushbutton assembly. The upper edge of the aperture 280 includes a lower element 284 and an upper element 286 between which is a vertical shoulder 288**.

When the lockbar 262 is moved in advancing direction (to the left—FIG. 16), and the tension spring 270 swings the latch pawl 272 downwardly (when otherwise free to do so), the vertical shoulder 288 engages in front of the pin 282 and locks the lockbar in advanced position. However, in the control movements of the lockbars 262, blocking lever arms 290 are moved in upward direction, and they hold the latch pawls 272 in upper position, and prevent the shoulder 288 from engaging in front of the pins 282. The arms 290 are controlled through certain electrical instrumentalities as explained hereinbelow. Upon a selection being made by depression of the corresponding pushbuttons 254, and the lockbars 262 being advanced, if conditions are otherwise appropriate for the selection to be made, the arms 290 are lowered and the latch pawls 272 are permitted to be lowered under the action of the springs 278 for the locking operation as explained.

Figure 18:
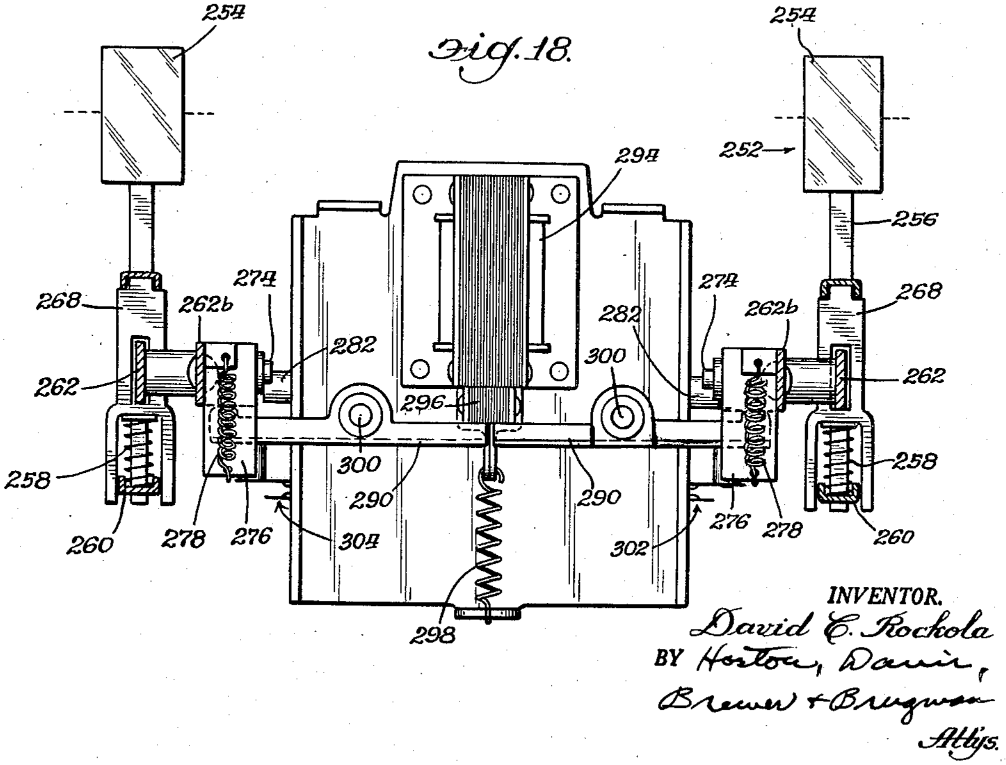
FIG. 18 is a cross-sectional view of the pushbutton assembly and taken approximately at line 18—18 of FIG. 15.
Figures 15, 16:
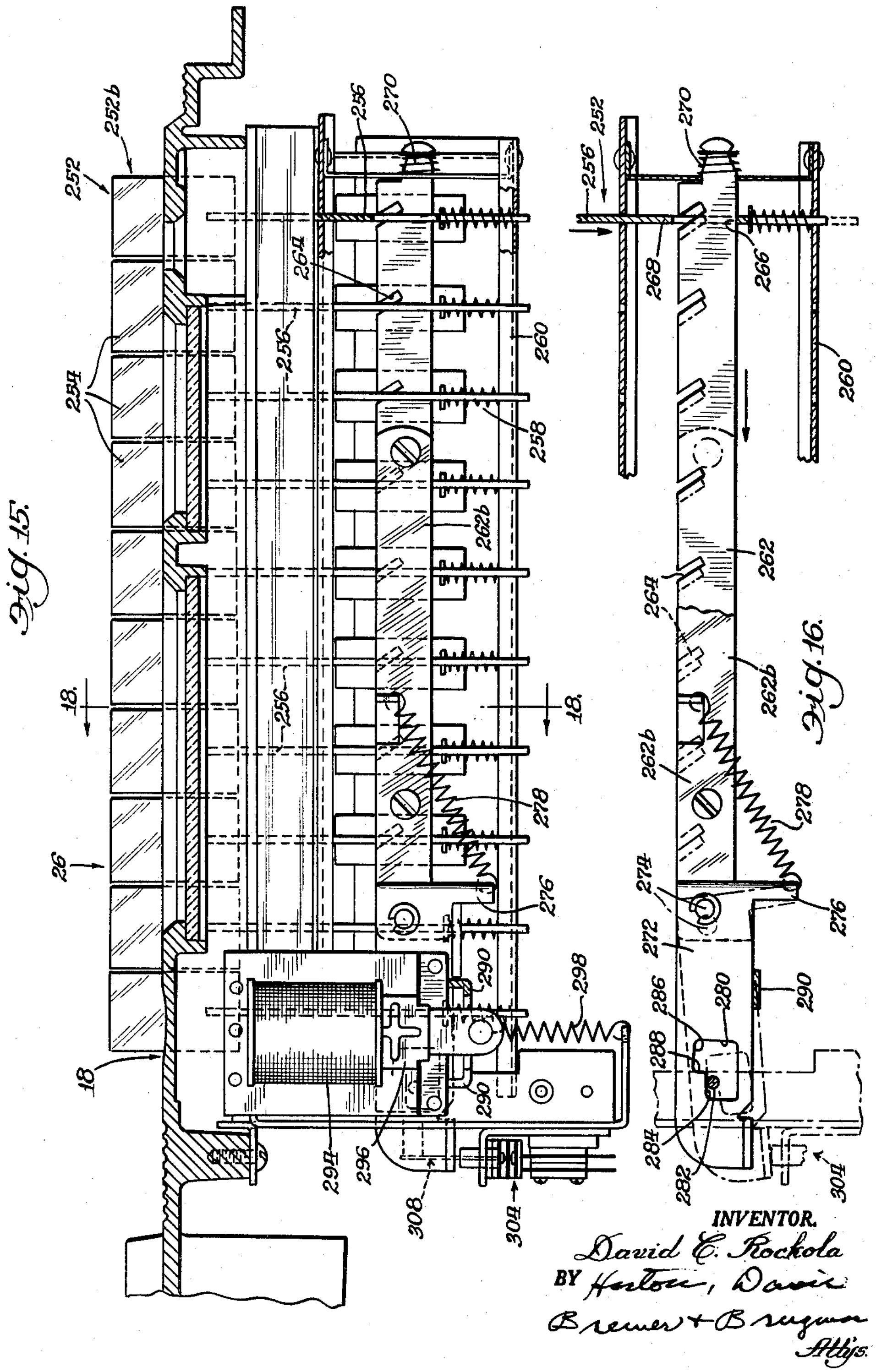
FIG. 15 is a longitudinal sectional view of the pushbutton assembly and taken approximately at line 15—15 of FIG. 1.
FIG. 16 is a view of only certain of the members included in FIG. 15, isolated from the remaining structure, and oriented in the same direction as FIG. 15.
Figure 17:
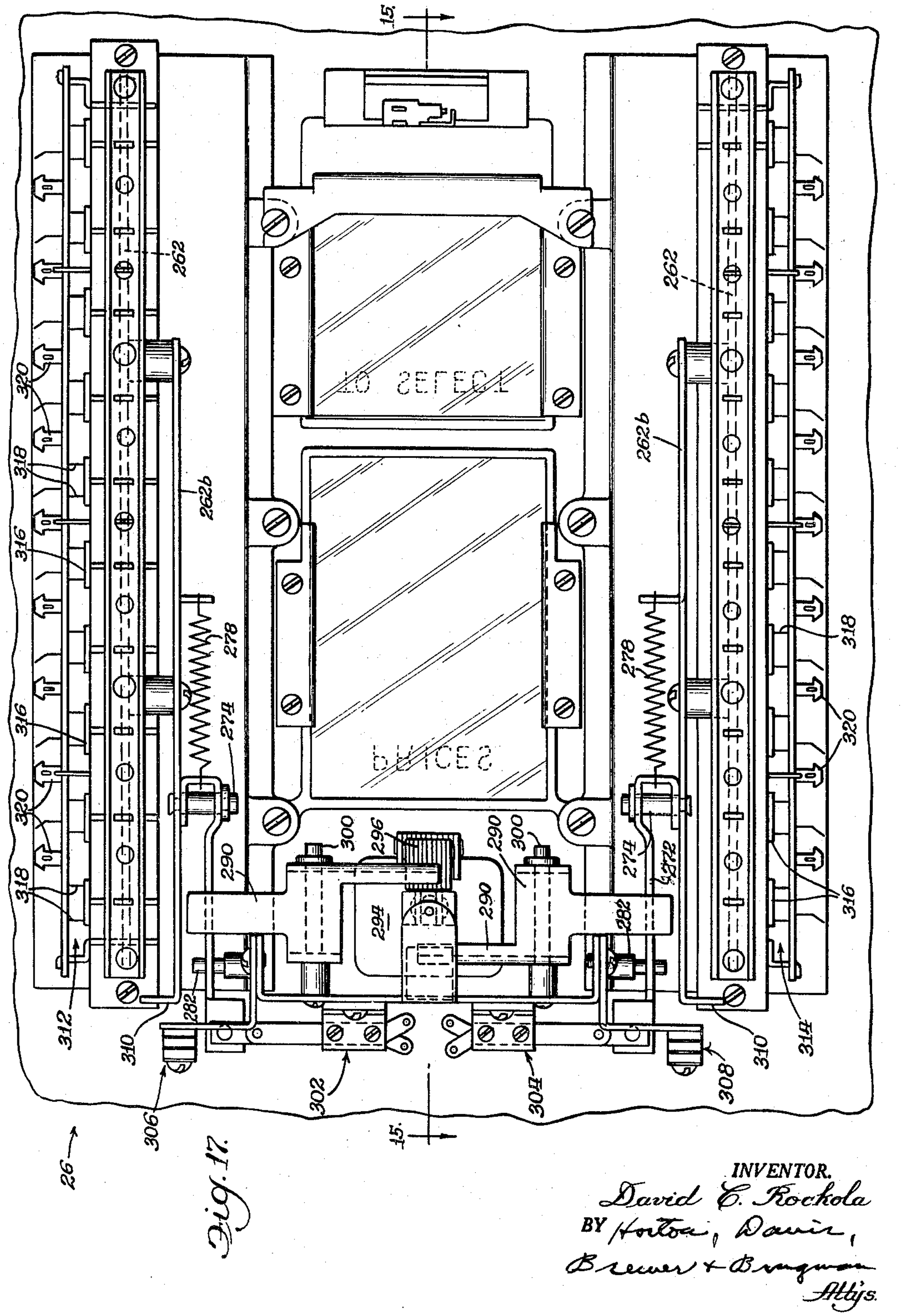
FIG. 17 is a bottom view of the pushbutton assembly shown in FIG. 15.

The blocking arms 290 which control the position of the latch pawls 272 are themselves controlled by solenoid 294 which will be referred to again in the description of the electrical circuit. This solenoid remains energized so long as there is credit set up on the machine by the deposit of coins by a patron for the purpose of playing the records. The solenoid 294 is mounted in suitable frame elements of the assembly and has an armature 296 attracted inwardly upon energization of the solenoid and outwardly by the tension spring 298 upon deenergization of the solenoid. The blocking arms 290, as best shown in FIGS. 17 and 18, are pivotally mounted on suitable pins 300. Upon energization of the solenoid, and raising of the armature 296 thereof, the inner ends of the arms 90 are raised, resulting in lowering of the outer end of the arms and permitting the latch pawls 272 (FIG. 50) to be lowered under the action of the springs 278 so that the locking effect can be accomplished, namely, the pins 282 engaged by the vertical shoulders 288. Conversely, when the solenoid 294 is deenergized, the spring 298 positively lowers the armature and the inner ends of the arms 290, this spring being stronger than the springs 278 and operative for forcibly raising the outer ends of the arms 290 and raising the latch pawls 272 to their upper position shown in full lines in FIG. 16 thereby preventing the locking action referred to. Thus, so long as credit is set up in the machine, and the solenoid consequently remains energized, the lockbars 262 are locked in advanced position upon a selection being made by depression of the pushbuttons 254. While on the other hand, if there is no credit set up in the machine, the solenoid remains deenergized, and depression of the pushbuttons advances the lockbars 262 but then are held in advanced position only while the pushbuttons are held in depressed position, and upon release thereof they are returned to their normal outer position and the lockbars 262 are returned to their home or retracted positions.

The transverse elements 268 (FIGS. 15 and 16) of the stems 256 of the pushbuttons are all arranged in register with the open ends of the respective slots 264 when the lockbars 262 are in their retracted positions. Thus upon depression of any pushbutton, the corresponding transverse element 268 enters into the slot and advances the bar. When the lockbar 262 is locked in advanced position, in the manner just described, the open ends of the slots 264 corresponding to those pushbuttons which have not been depressed, are out of register with the corresponding transverse elements 268 and thus only the one pushbutton in each row 252 can be depressed at a time.

Each selection requires the depression of a pushbutton in each of the rows **252*a* and 252*b***, namely a letter pushbutton and a numeral pushbutton, and upon depression of these pushbuttons, when all other conditions are properly set up for operation of the phonograph, the operation begins.

The pushbutton assembly includes switches 302 and 304 arranged for actuation by the latch pawls 272. In the instant construction, these switches are arranged for closure in response to the latch pawls 272 being swung downwardly, and they are held in closed position so long as the latch pawls remain in lowered position. Additional switches 306 and 308 are arranged for actuation by the lockbars 262 in response to advancing movement of those bars, by means of turned over ends 310 (FIGS. 15 and 17) which engage the leaves of those switches. In the case of the switches 302 and 304, these are actuated only when the lockbars 262 are advanced and the latch pawls 272 are in lowered position, but on the other hand, the switches 306 and 308 are actuated by the lockbars each time the latter are advanced.

Also included in the pushbutton assembly are other switches actuated by the pushbuttons, these switches being a first row 312 associated with the letter pushbuttons **252*a* and a second row of switches 314 associated with the number pushbuttons 252*b*. These switches include a plunger element 316 (FIG. 17) mechanically connected to the stems 256 of the pushbuttons and contact elements 318 on each plunger element arranged for engaging contact elements mounted on fixed frame elements of the assembly. The switches, of known type, include terminal elements 320 for connection of conductors thereto. The switches 312 in the letter pushbuttons 252*a* have three contact elements while the other switches 314 associated with the number pushbuttons 252*b*** have only two contact elements.

Attention is directed next to the circuit diagram shown in different conditions in FIGS. 19 to 23, inclusive. The same diagram is included in each of these figures, but different portions thereof are shown energized in different figures, the heavy lines indicating energized portions. The diagram is shown as including an A.C. line 316 and a D.C. line 318 connected with a common return 320. Certain of the electrical instrumentalities identified above will be found herein, including the lockbar solenoid 294 (left end) the pushbutton lockbar switch for the letter pushbuttons 306, and the corresponding switch 308 for the number pushbuttons. Additionally, the latch pawl switch 302 for the letter pushbuttons and the latch pawl switch 304 for the number pushbuttons are shown at the left end of the circuit.

The other switches, namely 312 and 314, connected with the pushbutton stems or plungers are adjacent the center of the diagram. The three contacts of the letter pushbuttons shown at 312 and individually identified in banks or groups 312A, 312B, there being ten in each group, one of each group being related to the corresponding pushbutton.

The other switches 314, associated with the letter pushbuttons, are also shown in the diagram, these switches having two contacts each, as explained above, and here identified as 314A and 314B, there being ten in each of these groups and one of each group associated with each of the number pushbuttons.

A coin control switch assembly 322 (right, top) of known type is incorporated in the electrical circuit, having individual switches **322*a*, 322*b*, 322*c* and 322*d*, respectively closed momentarily by insertion of coins in the usual coin insert means. The individual switches thereof, as indicated, represent different values of coins and for purposes of example herein the 25¢ switch 322*c* is shown closed, which completes a circuit portion through the circuit diagram. Associated with the switches is a coil assembly 324 (right, bottom) including a plurality of coils 324*a*, 324*b* and 324*c*. Included in the circuit also is a credit unit which also may be of known kind, such for example as disclosed in the co-pending application of myself and others, Serial No. 849,546, filed October 29, 1959, now Patent No. 3,082,853, issued March 26, 1963. The credit unit includes a toothed ratchet which is advanced in steps corresponding to the value of the coins inserted, being advanced by the three coils 324 according to the values of the coins with which they are associated. For example, upon the insertion of a 25¢ piece the switch 322*c* is closed whereupon the coil 324*a* is energized, this coil advancing the toothed ratchet in the credit unit an amount representing 25¢, such as five increments or steps. The toothed ratchet closes the accumulator credit switch 326 (left, lower) and this switch remains closed so long as any credit is set up in the credit unit, in a known manner. Conversely, when all of the credit is expended, and the toothed ratchet returns to its home or retracted position, the switch 326 is permitted to open. As an incidental operation to the energization of the coil 324*a*, an additional switch 328** is closed (left, lower) for lighting a signal light suitably placed in the phonograph to indicate to the patron that a selection may be made.

The accumulator credit switch 326 is included in a conductor 330 which also includes the lockbar solenoid 294 and an attract delay relay switch 332 (upper left hand corner) which is controlled by an attract delay relay coil 334 (upper right hand corner). Thus upon deposit of the coin and closure of the switch 332, a circuit is completed from the D.C. source 318 to the common return 320; as a result of the closure of the normally open switch 326 by the operation just referred to, a second circuit is closed from the A.C. source 316 to the common return 320. This thus sets up the circuit for the next operation which is depression of the pushbuttons 252 which may now be done effectively, with operating steps taking place in the machine.

At this stage of the condition of the circuit the lockbar solenoid 294, being energized, holds the armature 296 (FIG. 18) in raised position which relieves the force of the armature on the inner ends of the arms 290. As a consequence the tension springs 278 (FIGS. 15 and 16) move the latch pawls 272 downwardly (FIG. 16) so that upon depression of the pushbuttons the lockbars 262 when advanced (to the left—FIGS. 15 and 16) will be locked in advanced position by the shoulders 288 engaging the pins 282, as explained above. For the following description of the operation of the phonograph it is assumed that the patron depresses the letter pushbutton E and the number pushbutton 5, as indicated in FIG. 20.

An important feature of the invention is the arrangement of the various elements in the electrical portion of the machine that are utilized for establishing the permutations in a simple manner so as to effect the attainment of maximum permutations with a minimum number of elements. For this purpose the switches 312 and 314 are separated into different parts, these parts being adapted for selective connection for establishing maximum permutations.

Adjacent the center of FIG. 19 showing the circuit diagram, is included the contact strip segments 208 (FIG. 5) namely **208*a*, 208*b*, 208*c*, 208*d*, 208*e*, shown connected with certain of the switches 314. In this circuit diagram are also shown the rivet contact elements 210 (FIG. 5) below the contact segments 208. There are five of the contact strip segments 208 and fifty rivets 210, or ten rivets associated with each of the contact segments. It will be recalled that the capacity of the illustrated machine is fifty records, and there are thus one of the rivets 210 for each of the records, but the one hundred sides on those records can be individually selected by combinations made possible between the segments and rivets. The contact arms 222 and 224 described above in connection with FIG. 5 are shown in FIG. 20 connected together to form a shorting bar here identified 336 which bridges the contact strips 208 and rivets 210. It will be noted that the rivets 210 for any segment 208 are separated into two groups, one connected with respective switches 312A and the other with respective switches 312B. Connections made through the letter pushbutton switches 312A and 312B are connected respectively reversely in the circuit through the number pushbutton switches 314A below the switches 312 as will be seen from the conductors 338 and 340 respectively leading from the opposite groups of switches 312A and 312B to alternate ones of the switches 314A**.

Upon depression of the number pushbutton No. 5, the switches 314A and 314B (FIG. 20) corresponding to that pushbutton are moved to the abnormally closed (dotted-line) positions shown. At the same time the lockbar switch 308 (right, center) corresponding to the lockbar of the number pushbuttons is closed, but at this time there is no circuit completed therethrough. Another operation performed by depression of the number pushbutton is that the latch pawl switch 304 (left end, above center) shown also in FIG. 17, is closed by the latch pawl 272 corresponding thereto. In the same operation when the letter pushbutton representing the letter E is depressed, and with the connections heretofore described established, the following connections are made: the three switches 312A, 312B, and 312C connected with the E pushbutton are moved to their alternate closed (dotted-line) positions shown in FIG. 20 (center); at the same time lockbar switch 306 (right, center) as described in connection with FIG. 17 is closed; also letter latch pawl switch 302 (left end, above center) is closed referred to above in connection with FIG. 17.

Upon closing switches 302 and 304, a circuit is completed through conductors 330, 342 and 344 energizing the write-in relay coil 346 which then closes the normally open switches 348, 350 and 352. The switch 352 establishes a holding circuit through conductor 354 for the write-in relay coil 346. The switch 350 makes a circuit through conductor 356, normally closed switch 358 and conductor 360, the latter of which includes the selector write-in motor 88 (see also FIG. 4) referred to above and operative for rotating the write-in carriage 72. Upon such completion of the circuit through this motor, the write-in carriage 72 is rotated and it sweeps around the selector drum 40 until it reaches a "hot" rivet 210 corresponding to the selection made which in the instance assumed will be the third one from the left shown in FIG. 20. The shorting bar 336 then completes the circuit (FIG. 21) through conductor 362, switch 348, switch 314B corresponding to No. 5 pushbutton, contact strip segment 208*c* the shorting bar 336, conductor 364 corresponding to the selected rivet, switch 312A corresponding to the E pushbutton, conductor 338, switch 314A corresponding to the No. 5 pushbutton and conductor 366 to the common return 320.

The shorting bar 336 engaging the hot rivet and segment 208*c* sets up or defines a subsequent step in the sequence of operation of the phonograph. Upon completion of the circuit through the conductor 362 as just described, the stop relay coil 368 (top, left) is energized, transferring the switch 370 (left, center), closing switch 372 (left, center) and transferring the switch 374 (top). The transfer of switch 370 establishes a circuit through conductor 376 and current limiting lamp 378 therein the switch 370 and the conductor 360. This circuit impresses the D.C. on the write-in motor 88 and brings it to an abrupt stop. The switch 372 provides a holding circuit for the stop relay coil 368 through conductors 380 and 382.

The switch 374 when moved to its transferred position shown in FIG. 22 completes a circuit through conductors 382 and 384 in the latter of which is the selector wobble plate solenoid 102 referred to above in the description of FIG. 7. Energization of the solenoid 102 effects movement of the wobble plate 142 in counterclockwise direction (FIG. 7) and actuation of the switch 100 and positions the wobble plate for facilitating movement of the selector levers 116 all as described above.

The switch 374, when moved to its transferred position shown in dotted lines in FIG. 22, also completes the circuit through conductor 386, in the latter of which is an accumulator reset coil 388 which thereupon is energized. Energization of this coil results in actuation of the credit unit referred to above in subtracting direction to remove from the setting thereof what represents one unit or one play, i.e. each time that a selection is played in the phonograph, one unit is subtracted from the credit unit. Energization of the accumulator reset coil 388 also closes switches 390 and 392 (top, right). Closure of the switch 390 completes the circuit through conductors 382, 394, 396, switch 398 and that switch 312C (right of center) which is controlled by the E pushbutton. This circuit is continued through conductors 400 and 402 (here 402) depending upon which side of the record in question is selected. The conductors 400 and 402 complete circuits through write-in carriage solenoids 168 or 170, respectively. The solenoids 168 and 170 were described above in connection with FIG. 5 and serve to set the selector lever 116 corresponding to the selection made, this operation being controlled by which of the switches 312B is moved to its alternate position.

Figure 14:
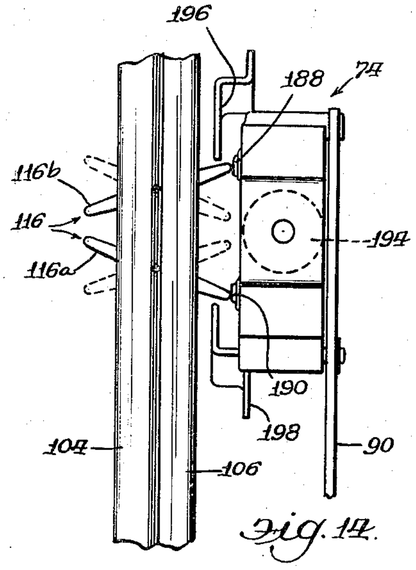
FIG. 14 is a sectional view showing the relation between the read-out carriage and the selector drum, and taken approximately at line 14—14 of FIG. 6.

In the circuit arrangement assumed in the present illustration, upon closure of the switch 390 (top, right) completion of the circuit controlled thereby and consequent energization of the write-in carriage solenoid 170, the selecting operation in the selector drum shown in FIG. 5 is performed, namely the bell crank lever 178 associated therewith is actuated, which engages the associated end of the selector lever (FIG. 13) and moves it to its alternate position or from its full line position to its dotted line position of FIG. 13 (to its full line position of FIG. 14). Thereupon the contact element 188 in the read-out carriage 74 engages that selector lever upon the read-out carriage 74 sweeping the selector drum. When that contact is made, the selected record is removed from the magazine and placed on the turntable and the playing operation is performed.

Closure of the switch 392 closes a circuit through conductor 404, attract delay relay coil 334 referred to above, and conductor 406 which leads to conductor 386. This circuit momentarily energizes the coil 334 which closes normally open attract delay relay switch 408, opens normally closed switch 398 and switch 332 (top, left). The switch 408 provides a holding circuit to the coil 334, in view of the previous closure of switch 306 and 308 in the conductor 410 which are retained closed by the lockbars 362. Opening of the switch 398 (right) disconnects the carriage write-in solenoid 168 or 170 whichever was energized depending upon which of the switches 312B was set. Opening of switch 332 (top, left) de-energizes the lockbar solenoid 294 which releases the latch pawls 272 and permits the switches 302 and 304 (FIG. 18) to open.

Opening of switch 332 (top, left) further de-energizes coil 346, which opens the switches 352, 350 and 348. Opening of the switch 348 de-energizes the stop relay coil 368 (top, left) which releases switch 358 which moves to its position of FIG. 20, permits the switch 372 to open and the switch 374 to move to its first position of FIG. 19.

Opening of the switch 374 (top, right) opens the circuit to the selector wobble plate solenoid 102 and the wobble plate (FIG. 7) is free to return to its retracted position under the influence of the spring 166 if none of the selector levers 116 are in their selected position, and in engagement with the elements 156 of the apertures.

Opening of the switch 374 (top, right) furthermore opens the circuit to the accumulator reset coil 388 (top, right) which opens the switches 390 and 392. If at this time all of the pushbuttons 252 are released, the circuit through the coil 334 (top, right) is broken by opening of the lockbar switches 306 and 308 (right, center). This permits the switch 332 to reclose thereby allowing the lockbar solenoid 294 (left, center) to operate provided that credit exists in the credit unit, i.e., so long as the accumulator credit switch 326 (left, lower) is closed. If one or more of the pushbuttons should be forcibly held in during the release of the attract delay relay coil 334 (top, right) it will remain energized and the lockbar solenoid 294 (top, left) cannot reclose.

A reset switch 412 is interposed in the conductor 330 for cancelling a partial selection, if such should be desired as when one pushbutton is depressed and before another one is depressed the patron changes his mind. This switch may be operated by a manual pushbutton 414 (FIG. 1).

The foregoing steps in the operation of the electrical circuit described is a selecting operation, almost entirely, that is, when a pushbutton of each group is depressed, while credit exists in the machine, the selecting operation takes place. In this operation the write-in carriage 72 moves up to the position representing the selection made, and stops. The selector lever 116 in the outer or inner row whichever represents the selection made, is moved to its set position.

Meanwhile after a selection is made, the actual playing operation takes place, substantially in the manner disclosed in my prior Patent No. 2,804,307, referred to above, that is the magazine is rotated for bringing the selected record to indexing position, the selected record is transferred from the magazine to the turntable, played and transferred back to the magazine. The read-out carriage 74 sweeps the selector drum, it being mounted for movement conjointly with the magazine, and when it reaches the position representing the selected record, and the contact element 188 (or 190) therein (FIG. 14) engages the selector lever in set position, as mentioned above a circuit is set up for stopping the magazine, as well as the carriage itself, and performing the record playing steps referred to. The selector levers 116 become elements in the circuit through the contact elements 188 and 190.

The record playing steps are controlled directly by the switch 100 (FIG. 7) which is closed by the wobble plate 142. Since the wobble plate is retained in advanced position, in which the switch is closed, by any one or more of the selector levers, so long as any selections remain in the machine, the playing operations are repeated, and at each operation the respective selector lever is cancelled and returned to normal position by the corresponding solenoid 192 or 194.

As many selecting operations as desired may be made without regard to whether the selected records are played, that is, it is not necessary in making a record selection to wait for the first to be played. After each depression of the necessary pushbuttons, the write-in carriage moves to the corresponding position and sets the corresponding selector lever, and the next selection can be made, and after a single selection is made, the corresponding playing operation is performed and repeated until any additional selected records are played.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred embodiments thereof.

I claim:

1. In an automatic phonograph, a magazine having a plurality of record receiving pockets and movable for positioning the pockets selectively at an indexing position, a turntable, mechanism for transferring a record between a pocket at said indexing position and the turntable, and selector mechanism including a selector assembly having a plurality of selector elements including one for each of said pockets, said selector assembly including a disc member and said selector elements being pivoted in said disc member with their ends projecting through opposite sides thereof, a write-in carriage operable through a cycle for setting said selector elements, manually actuatable means for controlling said carriage through a cycle, a read-out carriage mounted for movement with the magazine and operable for sensing those of said selector elements set by the write-in carriage, and means operable in response to sensing of a set selector element by the read-out carriage for stopping the magazine at a position corresponding to the respective selector element and transferring the record in the pocket then in said indexing position to the turntable, said write-in and read-out carriages having operating members disposed transverse to said selector elements and engageable therewith in such directions and operative upon actuation thereof for respectively setting and cancelling the selector elements.

2. An automatic phonograph comprising, in combination, a record magazine having a plurality of record receiving pockets and movable for selectively placing said pockets at an indexing position, means for removing a record from the magazine at the indexing position thereof, playing it, and replacing it in the magazine, selector means for controlling the movements of the magazine and playing of the records, including a plurality of manually and selectively actuated pushbuttons, a selector assembly having a plurality of selector elements one for each side of a record in each of said pockets, a write-in carriage mounted for sweeping along said selector elements, means controlled by said pushbuttons for moving the write-in carriage along the selector elements, means also controlled by the pushbuttons for operating the write-in carriage to move those selector elements corresponding to the respective pushbuttons actuated, from a normal position to a set position, a read-out carriage movable in unison with the magazine along said selector elements and operative to sense those selector elements which are in their set position, and means operative in response to sensing of a set selector element by the read-out carriage for stopping movement of the read-out carriage and the magazine and operating the record removing, playing and returning means for playing the record in the pocket at the indexing position.

3. An automatic phonograph comprising in combination, a record magazine having a plurality of record receiving pockets and movable for selectively placing said pockets at an indexing position, means for removing a record from the magazine at the indexing position thereof, playing it, and replacing it in the magazine, selector means for controlling the movements of the magazine and playing of the records, including a plurality of selector elements arranged in two rows, each row being associated with one side each of all the records in the pockets of the magazine, a write-in carriage movable along the selector elements and having an actuating means therein for each of said rows, manually actuated means for individually moving selected ones of the selector elements from a normal position to a set position, a read-out carriage movable along the selector elements and having means for each of said rows for sensing those selector elements that are in their set position, and means operative in response to sensing of the selector elements by the read-out carriage for operating the removing, playing, and returning means for playing the record in the pocket of the magazine at said indexing position.

4. An automatic phonograph comprising, in combination, a record magazine having a plurality of record receiving pockets and movable for selectively placing said pockets at an indexing position, means for removing a record from the magazine at the indexing position thereof, playing it, and replacing it in the magazine, selector means for controlling the movements of the magazine and playing of the records, a plurality of selector elements one for each side of each record in the pockets of the magazine, said selector elements being arranged in two rows, and those selector elements associated with the same record being aligned radially, mechanical write-in selector means movable along the selector elements and including means for moving the selector elements from a normal position to a set position, manually controlled electrical means for moving the write-in selector means along the selector elements and moving selected ones of the selector elements to set positions, mechanical read-out selector means movable along the selector elements, and electrical means operable in response to movement of the read-out selector means along the selector elements and sensing a set one of the selector elements for placing in operation the removing, playing, and returning means for playing the record in the pocket in the magazine at the indexing position.

5. An automatic phonograph comprising, in combination, a record magazine having a plurality of record receiving pockets and movable for selectively placing said pockets at an indexing position, means for removing a record from the magazine at the indexing position thereof, playing it, and replacing it in the magazine, and including means for reversing the records for selectively placing either side up for playing, selector means for manually selecting the records for playing including a plurality of manually actuated push-buttons operative for selecting each side of each record in the pockets, a selector drum, a plurality of electrical contact rivets in the drum one for each record in the pockets in the magazine, a plurality of contact strips in the drum fewer in number than the rivets and each associated with a plurality of rivets, a write-in carriage movable over the contact rivets and strips and having a shorting bar wiping the contact rivets and strips, means for driving the write-in carriage, a selector lever associated with each side of each record in the pockets in the magazine, said write-in carriage having actuating means for moving said levers from a normal position to a set position, means controlled by the pushbuttons for putting in circuit the contact rivet corresponding to the selected record, means controlled by the reversing means for operating the actuating means in the write-in carriage for moving the one of the selector levers associated with the side of the selected record placed upwardly, and means for sensing the set selector levers and controlling playing of the selected record.

6. The invention set out in claim 5 in which the magazine has a predetermined cycle of operation including a plurality of rotations, and means controlled by the magazine is provided for controlling the reversing means whereby a first side of a record is placed upward in one rotation and the second side is placed upward in another rotation, and the controlling means further controls the actuating means in the write-in carriage for moving to set position the one of the selector levers associated with the selected record that corresponds to the side of the selected record facing upwardly.

7. In an automatic phonograph, a magazine having a plurality of record receiving pockets, a pair of groups of pushbuttons each upon depression thereof controlling a plurality of switch contacts, the pushbuttons being arranged for depression of one of each group for selecting a side of a record in a pocket of the magazine, a selector drum, a plurality of contact rivets in the drum, a plurality of contact strips in the drum fewer in number than the rivets and each associated with a plurality of and different rivets, a plurality of selector levers one associated with each side of each record in the pockets in the magazine, a write-in carriage mounted for movement along the contact rivets and strips and the selector levers and having a shorting bar for shorting the rivets and strips and also having actuating means for moving the selector levers from a normal position to a set position, circuit means including said switches and contact rivets and strips, the contact rivets of each group being divided between the switches of the pushbuttons of one of the groups, and others of the switches of said one group of the pushbuttons being connected in circuit for placing the contact rivets in mutually opposite circuit portions, switches of the second group being operative for completing circuit through the foregoing elements, the circuit means when so completed being operative for moving the write-in carriage to position corresponding to a selected record and to operate the actuating means in the write-in carriage for moving to set position that selector lever corresponding to the selected record side, read-out means for sensing the selector levers, and means controlled by the read-out means for playing a record pursuant to selection thereof.

8. A selector assembly comprising a drum, a plurality of selector levers mounted in the drum and each having opposite end portions exposed to the exterior in respective first and second area, a write-in carriage mounted for movement over the first area along the selector levers at a first end thereof, actuating means in the write-in carriage for moving the selector levers from a normal position to a set position, a read-out carriage mounted for movement over the second area above the selector levers at a second end thereof, means in the read-out carriage for contacting the selector levers when the latter are in their set position, and means in the read-out carriage for moving the selector levers to their normal position.

9. The invention set out in claim 8 in which the selector levers are pivoted at their mid-portion in the drum and are arranged with their end portions projecting out opposite sides of the drum.

10. The invention set out in claim 9 in which the means for moving the selector levers include solenoid-operated actuators.

11. The invention set out in claim 8 in which the selector levers are arranged in two concentric circular rows and those in the different rows are moved in respectively opposite directions in moving from normal to set positions, and the means in the carriages for moving the selector levers are disposed outwardly of the outer row and inwardly of the inner row, respectively.

12. A selector assembly comprising a pair of cover plates, a center plate between the cover plates, a plurality of selector levers in the center plate with their end portions projecting through holes in the cover plates, the selector levers being pivotal in planes extending radially and axially, a write-in carriage on one side of the drum and a read-out carriage on the opposite side thereof, both movable along the selector levers and having means for moving the selector levers to respectively opposite positions, and the read-out carriage having electrical contact means for engaging the selector levers when the latter are in a predetermined position.

13. A selector drum comprising a pair of cover plates, a center plate between the cover plates and in rigid assembly therewith, a wobble plate between the cover plates and rockable about a central axis, a plurality of selector levers mounted in the center plate and having their end portions on one side projecting through one cover plate and on the other side through the wobble plate and the other cover plate, the selector levers being positioned in holes in the center plate, a ring supported by the center plate received in apertures in the selector levers and forming means for pivotally mounting the selector levers, spring means in said holes in the center plate yieldingly retaining the selector levers in either of two opposite stable positions, said wobble plate having holes receiving the selectors levers which on one marginal edge have offset portions engageable by the selector levers in one of their two said positions whereby any of the selector levers retains the wobble plate in an advanced position of rocking about its said axis, switch means controlled by the rocking movements of the wobble plate, a write-in carriage movable over one of the cover plates along the selector levers and including means for moving the selector levers from one of their positions to the other, and a read-out carriage movable over the other cover plate along the selector levers and including means for moving the selector levers in return direction to their said one position.

References Cited by the Examiner

UNITED STATES PATENTS

| | | | |
|---|---|---|---|
| 2,342,652 | 2/44 | Eakins | 340—162 |
| 2,411,612 | 11/46 | Boyajian | 340—162 |
| 2,949,309 | 8/60 | Riggs | 274—10 |
| 2,952,463 | 9/60 | Vanderzee et al. | 274—10 |

NORTON ANSHER, *Primary Examiner.*

JOHN P. WILDMAN, EMIL G. ANDERSON, *Examiners.*